(12) United States Patent
Kim

(10) Patent No.: US 10,671,336 B2
(45) Date of Patent: Jun. 2, 2020

(54) METHOD AND DEVICE FOR CONTROLLING SCREEN SHARING AMONG PLURALITY OF TERMINALS, AND RECORDING MEDIUM

(71) Applicant: Samsung Electronics Co., Ltd., Gyeonggi-do (KR)

(72) Inventor: Yong-tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/524,993

(22) PCT Filed: Nov. 2, 2015

(86) PCT No.: PCT/KR2015/011630
§ 371 (c)(1),
(2) Date: May 5, 2017

(87) PCT Pub. No.: WO2016/072675
PCT Pub. Date: May 12, 2016

(65) Prior Publication Data
US 2018/0285054 A1    Oct. 4, 2018

Related U.S. Application Data

(60) Provisional application No. 62/075,380, filed on Nov. 5, 2014.

(30) Foreign Application Priority Data

Oct. 30, 2015 (KR) ................. 10-2015-0152530

(51) Int. Cl.
G06F 3/14 (2006.01)
H04L 12/24 (2006.01)
H04L 29/08 (2006.01)

(52) U.S. Cl.
CPC ............. *G06F 3/1462* (2013.01); *G06F 3/14* (2013.01); *H04L 41/5067* (2013.01); *H04L 67/10* (2013.01)

(58) Field of Classification Search
CPC ........ G06F 3/1462; G06F 3/14; G06F 3/1423; G06F 3/1454; H04L 41/5067;
(Continued)

(56) References Cited

U.S. PATENT DOCUMENTS 7,940,653 B2 * 5/2011 Woodworth .......... H04L 67/306
370/229
8,144,187 B2 * 3/2012 Moore .................. H04N 7/152
348/14.09

(Continued)

FOREIGN PATENT DOCUMENTS

CN    102484748 A    5/2012
CN    102883135 A    1/2013
(Continued)

OTHER PUBLICATIONS

Communication dated Aug. 14, 2017 in connection with European Patent Application No. 15 85 6594.
(Continued)

*Primary Examiner* — Patrice L Winder

(57) ABSTRACT

The present disclosure relates to technologies for sensor networks, machine to machine (M2M), machine type communication (MTC), and Internet of Things (IoT). The present disclosure may be used in intelligent services based on such technologies (smart homes, smart buildings, smart cities, smart cars or connected cars, health care, digital educations, retail businesses, securities, disaster network communication, and safety-related services). Provided is a method of controlling, by a relay device, screen sharing between a plurality of terminals, the method includes: receiving a screen image of a first terminal from the first
(Continued)

terminal; and transmitting the received screen image to at least one second terminal.

14 Claims, 16 Drawing Sheets

(58) Field of Classification Search
CPC ........ H04L 67/10; H04N 19/70; H04N 21/61; G09G 2360/08; G09G 2350/00
See application file for complete search history.

(56) References Cited

U.S. PATENT DOCUMENTS

| | | | | |
|---|---|---|---|---|
| 8,312,164 B2* | 11/2012 | Vass | ............... | H04N 7/148 709/233 |
| 8,537,699 B2* | 9/2013 | Leung | ............... | H04N 21/44209 370/252 |
| 8,611,271 B2* | 12/2013 | Erkip | ............... | H04B 7/15592 370/310 |
| 8,805,342 B2* | 8/2014 | Cao | ............... | G06Q 10/10 455/414.2 |
| 8,842,159 B2* | 9/2014 | Lu | ............... | H04N 7/147 348/14.08 |
| 8,862,762 B1* | 10/2014 | Motrenko | ............... | H04L 51/10 709/230 |
| 8,868,735 B2* | 10/2014 | Wang | ............... | H04L 69/16 709/223 |
| 8,908,757 B2* | 12/2014 | Gu | ............... | H04N 7/152 375/240.01 |
| 9,035,991 B2* | 5/2015 | Shen | ............... | H04N 7/15 348/14.03 |
| 9,055,043 B2* | 6/2015 | Suryavanshi | ............... | H04L 67/06 |
| 9,060,191 B2* | 6/2015 | Chhaochharia | ............... | H04L 47/24 |
| 9,104,241 B2* | 8/2015 | Le | ............... | G06F 3/017 |
| 9,106,887 B1* | 8/2015 | Owen | ............... | H04N 19/102 |
| 9,118,801 B2* | 8/2015 | Tapia | ............... | H04N 21/26216 |
| 9,209,887 B2* | 12/2015 | Long | ............... | H04B 7/15 |
| 9,232,244 B2* | 1/2016 | Chen | ............... | H04N 21/23406 |
| 9,282,297 B2* | 3/2016 | Siann | ............... | H04N 7/183 |
| 9,369,671 B2* | 6/2016 | Avni | ............... | H04N 7/152 |
| 9,588,652 B2* | 3/2017 | Bhogal | ............... | G06Q 10/101 |
| 9,686,183 B2* | 6/2017 | Khan | ............... | G06F 9/505 |
| 9,973,729 B2* | 5/2018 | Morrison | ............... | H04N 7/147 |
| 2004/0075619 A1 | 4/2004 | Hansen | | |
| 2004/0253991 A1 | 12/2004 | Azuma | | |
| 2006/0159124 A1* | 7/2006 | Henry | ............... | H04M 7/006 370/468 |
| 2007/0112938 A1* | 5/2007 | Belimpasakis | ... | H04L 29/08846 709/219 |
| 2009/0006533 A1* | 1/2009 | Guo | ............... | H04L 65/1046 709/203 |
| 2009/0327918 A1* | 12/2009 | Aaron | ............... | H04L 1/0009 715/751 |
| 2010/0005178 A1* | 1/2010 | Sindelaru | ............... | H04L 47/10 709/228 |
| 2010/0316066 A1 | 12/2010 | Leung | | |
| 2012/0179833 A1* | 7/2012 | Kenrick | ......... | H04N 21/234309 709/231 |
| 2012/0209933 A1* | 8/2012 | Ridges | ............... | H04L 65/403 709/208 |
| 2012/0233644 A1* | 9/2012 | Rao | ............... | H04M 1/7253 725/62 |
| 2012/0304240 A1* | 11/2012 | Pereira | ............... | H04N 21/2187 725/116 |
| 2012/0307078 A1* | 12/2012 | Canan | ............... | H04L 65/605 348/207.1 |
| 2013/0073965 A1 | 3/2013 | Sik et al. | | |
| 2013/0125009 A1* | 5/2013 | DeLuca | ............... | G06F 16/958 715/740 |
| 2013/0129142 A1 | 5/2013 | Miranda-Steiner | | |
| 2013/0135179 A1 | 5/2013 | Ko | | |
| 2013/0177071 A1* | 7/2013 | Lu | ............... | H04N 19/30 375/240.03 |
| 2013/0208075 A1 | 8/2013 | Lu et al. | | |
| 2013/0238702 A1 | 9/2013 | Sheth et al. | | |
| 2013/0254330 A1* | 9/2013 | Maylander | ............... | H04L 65/607 709/217 |
| 2013/0286227 A1* | 10/2013 | Lau | ............... | G06F 3/005 348/207.1 |
| 2013/0304934 A1 | 11/2013 | Joch et al. | | |
| 2014/0032735 A1 | 1/2014 | Kapoor | | |
| 2014/0129676 A1* | 5/2014 | Zeng | ............... | H04L 65/403 709/217 |
| 2014/0146877 A1* | 5/2014 | Delegue | ............... | H04N 21/23418 375/240.02 |
| 2014/0189064 A1* | 7/2014 | Cilli | ............... | H04N 21/23439 709/219 |
| 2014/0219088 A1* | 8/2014 | Oyman | ............... | H04N 21/23439 370/231 |
| 2014/0289423 A1 | 9/2014 | Kim et al. | | |
| 2014/0317262 A1* | 10/2014 | Bouvet | ............... | H04L 41/08 709/223 |
| 2015/0039998 A1 | 2/2015 | Lieb et al. | | |
| 2015/0381930 A1* | 12/2015 | Quinn | ............... | H04N 7/147 348/14.14 |

FOREIGN PATENT DOCUMENTS

| | | | |
|---|---|---|---|
| CN | 103944743 A | 7/2014 | |
| CN | 104077098 A | 10/2014 | |
| EP | 1510047 B1 | 10/2011 | |
| EP | 2597869 A1 | 5/2013 | |
| JP | 2004259163 A | 9/2004 | |
| WO | 2014157889 A1 | 10/2014 | |
| WO | WO-2015048457 A1 * | 4/2015 | ............. H04L 67/10 |

OTHER PUBLICATIONS

Foreign Communication from Related Counterpart Application, PCT Application No. PCT/KR2015/011630, Written Opinion of the International Searching Authority dated Mar. 3, 2016, 15 pages.
Foreign Communication from Related Counterpart Application, PCT Application No. PCT/KR2015/011630, International Search Report dated Mar. 3, 2016, 15 pages.
Summons to attend oral proceedings pursuant to Rule 115(1) EPC dated Feb. 14, 2019 in connection with European Patent Application No. 15 856 594.5, 27 pages.
Decision to refuse a European Patent application dated Aug. 21, 2019 in connection with European Patent Application No. 15 856 594.5, 41 pages.
Office Action dated Jun. 18, 2019 in connection with Chinese Patent Application No. 201580072552.6, 26 pages.
Provision of the minutes in accordance with Rule 124(4) EPC dated Aug. 21, 2019, 4 pages.
The Second Office Action in connection with Chinese Application No. 201580072552.6 dated Dec. 25, 2019, 18 pages.

* cited by examiner

METHOD AND DEVICE FOR CONTROLLING SCREEN SHARING AMONG PLURALITY OF TERMINALS, AND RECORDING MEDIUM

CROSS-REFERENCE TO RELATED APPLICATION(S)

The present application claims priority under 35 U.S.C. § 365 to International Patent Application No. PCT/KR2015/011630 filed Nov. 2, 2015, entitled "METHOD AND DEVICE FOR CONTROLLING SCREEN SHARING AMONG PLURALITY OF TERMINALS, AND RECORDING MEDIUM", and, through 35 U.S.C. § 119 to Korean Patent Application No. 10-2015-0152530 filed Oct. 30, 2015, and 35 U.S.C. § 120 to U.S. Provisional Patent Application No. 62/075,380 filed Nov. 5, 2014, each of which are incorporated herein by reference into the present disclosure as if fully set forth herein.

TECHNICAL FIELD

The present disclosure relates to a method of controlling screen sharing between a plurality of terminals, an apparatus for controlling screen sharing between a plurality of terminals, and a non-transitory computer-readable recording medium having recorded thereon a program which, when executed by a computer, performs a method of controlling screen sharing between a plurality of terminals.

BACKGROUND ART

The Internet is evolving from human-centered connection networks, in which people generate and consume information, to Internet of Things (IoT) networks, in which distributed components, such as things, exchange and process information. In addition, Internet of Everything (IoE) technologies, in which big data processing technologies are combined to IoT technologies through connection to cloud servers, have emerged. In order to realize IoT, technical elements, such as sensing technologies, wired and wireless communication and network infrastructures, service interface technologies, and security technologies, are required, and thus recently, technologies, such as sensor networks, machine-to-machine (M2M), and machine type communication (MTC), for connection between things are being studied.

Under IoT environments, intelligent internet technology (IT) services that create new values to people's lives by collecting and analyzing data generated from connected things may be provided. IoT may be applied to various fields, such as smart homes, smart buildings, smart cities, smart cars or connected cars, smart grids, health care, smart appliances, advanced medical services, and disaster network communication, through convergence and combination between existing information technologies and various industries.

DETAILED DESCRIPTION OF THE INVENTION

Technical Problem

Provided are a method and apparatus for controlling screen sharing between a plurality of terminals, whereby quality of experience (QoE) is improved by transmitting a screen image through a relay device during screen sharing between the plurality of terminals.

Technical Solution

According to an aspect of an embodiment, a method of controlling, by a relay device, screen sharing between a plurality of terminals includes receiving a screen image of a first terminal from the first terminal and transmitting the received screen image to at least one second terminal.

BEST MODE

Figure 1:
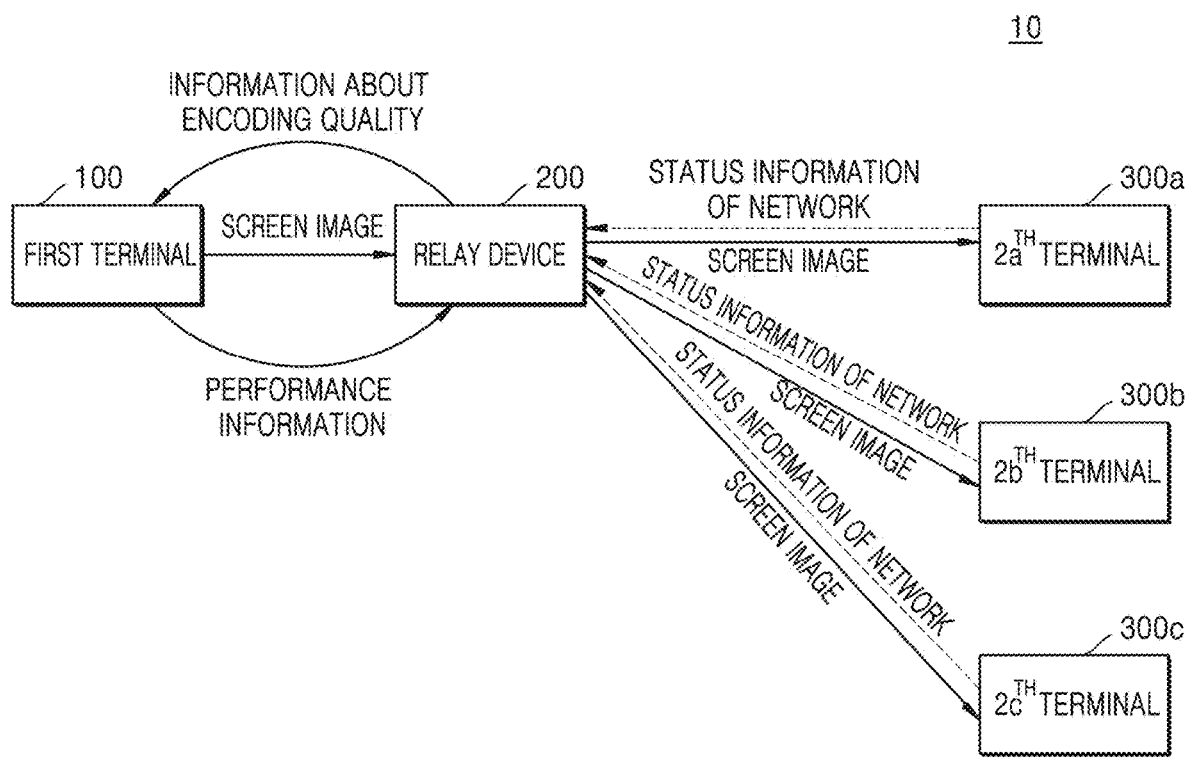
FIG. 1 is a diagram for describing a communication system for controlling screen sharing between a plurality of terminals, according to an embodiment.

According to an aspect of an embodiment, a method of controlling, by a relay device, screen sharing between a plurality of terminals, the method includes: obtaining performance information about screen image transmission of a first terminal that transmits a screen image, and status information of a network to which at least one second terminal that receives the screen image is included; determining encoding quality about the screen image of the first terminal based on the performance information and the statue information; receiving the screen image encoded by the first terminal based on the determined encoding quality; and transmitting the received screen image to the at least one second terminal.

The method may further include transmitting information about the determined encoding quality to the first terminal.

The determining of the encoding quality may include: determining a bit rate for transmitting the screen image to the at least one second terminal, based on the status information; and determining the encoding quality including at least one of resolution and a frame rate, based on the determined bit rate.

The relay device may be selected by the first terminal based on performance information of each of a plurality of second terminal that receives the screen image of the first terminal and the status information of the network to which each of the plurality of second terminal is included.

The method may further include: when performance of the relay device and a status of a network to which the relay device is included are outside a pre-set reference range, receiving, from the first terminal, a message notifying that a second terminal having performance and a status of a network corresponding to the pre-set reference range is selected from the at least one second terminal as a new relay device; and receiving the screen image encoded by the first terminal according to encoding quality determined by the selected second terminal from the selected second terminal.

The method may further include: obtaining identification (ID) information of the at least one second terminal from the first terminal; and setting a communication session with the at least one second terminal based on the obtained ID information.

The method may further include: obtaining ID information of the first terminal and ID information of the at least one second terminal from a server; and setting a communication session with the first terminal and the at least one second terminal based on the obtained ID information.

According to an aspect of another embodiment, a method of controlling, by a first terminal, screen sharing between a plurality of terminals, the method includes: obtaining, from a relay device that transmits a screen image of a first terminal to at least one second terminal, information about encoding quality of the screen image of the first terminal, which is determined based on performance information about screen image transmission of the first terminal and status information of a network to which each of the at least one second terminal is included; encoding the screen image of the first terminal based on the obtained information about the encoding quality; and transmitting the encoded screen image to the relay device, wherein the encoded screen image is transmitted to the at least one second terminal through the relay device.

The method may further include transmitting the performance information about the screen image transmission of the first terminal to the relay device.

The method may further include: selecting at least one of the plurality of second terminal as the relay device based on performance information of each of the plurality of second terminal that receives the screen image of the first terminal and the status information of the network to which each of the plurality of second terminal is included; and transmitting a message notifying the selecting of the relay device to each of the plurality of second terminal.

The method may further include: when performance of the relay device and a status of a network to which the relay device is included are outside a pre-set reference range, reselecting, as the relay device, another second terminal having performance and a status of a network corresponding to the pre-set reference range from among the at least one second terminal.

According to an aspect of another embodiment, a method of controlling, by a second terminal, screen sharing between a plurality of terminals, the method includes: transmitting, by a second terminal that receives a screen image of a first terminal, status information of a network to which the second terminal is included to a relay device; and receiving a screen image encoded by the first terminal from the relay device, according to encoding quality determined by the relay device, wherein the encoding quality is determined based on performance information about screen image transmission of the first terminal, which is obtained by the relay device, and status information of a network to which each of at least one second terminal that receives a screen image of the first terminal through the relay device is included.

According to an aspect of another embodiment, a relay device for controlling screen sharing between a plurality of terminals, the relay device includes: a communication unit configured to obtain performance information about screen image transmission of a first terminal that transmits a screen image and status information of a network to which each of at least one second terminal that receives the screen image is included; and a controller configured to determine encoding quality of the screen image of the first terminal based on the performance information and the status information, wherein the communication unit receives the screen image encoded by the first terminal based on the determined encoding quality, and transmits the received screen image to the at least one second terminal.

The communication unit may be further configured to transmit information about the determined encoding quality to the first terminal.

The controller may be further configured to determine a bit rate for transmitting the screen image to the at least one second terminal based on the status information, and determine the encoding quality comprising at least one of resolution and a frame rate based on the determined bit rate.

The relay device may be selected by the first terminal based on performance information of each of a plurality of second terminal that receives the screen image of the first terminal and the status information of the network to which each of the plurality of second terminal is included.

The communication may be further configured to, when performance of the relay device and a status of a network to which the relay device is included are outside a pre-set reference range, receive, from the first terminal, a message notifying that a second terminal having performance and a status of a network corresponding to the pre-set reference range is selected from the at least one second terminal as a new relay device, and receive the screen image encoded by the first terminal according to encoding quality determined by the selected second terminal from the selected second terminal.

The communication unit may be further configured to obtain identification (ID) information of the at least one second terminal from the first terminal, and the controller may be further configured to set a communication session with the at least one second terminal based on the obtained ID information.

The communication unit may be further configured to obtain ID information of the first terminal and ID information of the at least one second terminal from a server, and the controller may be further configured to set a communication session with the first terminal and the at least one second terminal based on the obtained ID information.

According to an aspect of another embodiment, a first terminal for controlling screen sharing between a plurality of terminals, the first terminal includes: a communication unit configured to obtain, from a relay device that transmits a screen image of a first terminal to at least one second terminal, information about encoding quality of the screen image of the first terminal, which is determined based on performance information about screen image transmission of the first terminal and status information of a network to which each of the at least one second terminal is included; a controller configured to determine encoding quality of the screen image of the first terminal based on the obtained information about the encoding quality; and an encoder configured to encode the screen image of the first terminal based on the determined encoding quality, wherein the communication unit is further configured to transmit the encoded screen image to the relay device, and the encoded screen image is transmitted to the at least one second terminal through the relay device.

The communication unit may be further configured to transmit the performance information about the screen image transmission of the first terminal to the relay device.

The controller may be further configured to select at least one of the plurality of second terminal as the relay device based on performance information of each of the plurality of second terminal that receives the screen image of the first terminal and the status information of the network to which each of the plurality of second terminal is included, and the communication unit may be further configured to transmit a message notifying the selecting of the relay device to each of the plurality of second terminal.

The controller may be further configured to, when performance of the relay device and a status of a network to which the relay device is included are outside a pre-set reference range, reselect, as the relay device, another second terminal having performance and a status of a network corresponding to the pre-set reference range from among the at least one second terminal.

According to an aspect of another embodiment, a second terminal for controlling screen sharing between a plurality of terminals, the second terminal includes: a controller configured to obtain, by the second terminal that receives a screen image of a first terminal, status information of a network to which the second terminal is included; and a communication unit configured to transmit the obtained status information, and receive a screen image encoded by the first terminal from the relay device, according to encoding quality determined by the relay device, wherein the encoding quality is determined based on performance information about screen image transmission of the first terminal, which is obtained by the relay device, and status information of a network to which each of at least one second terminal that receives a screen image of the first terminal through the relay device is included.

MODE OF THE INVENTION

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the terms "unit" or "module" used in the specification denotes a unit that processes at least one function or operation, and may be realized as hardware, software, or a combination of software and hardware.

Reference will now be made in detail to embodiments, examples of which are illustrated in the accompanying drawings. In this regard, the present embodiments may have different forms and should not be construed as being limited to the descriptions set forth herein. For clear description, elements that are irrelevant to the present disclosure are not illustrated in drawings and like reference numerals refer to like elements throughout.

FIG. 1 is a diagram for describing a communication system 10 for controlling screen sharing between a plurality of terminals 100, 300a, 300b, and 300c, according to an embodiment.

The communication system 10 according to an embodiment may include the plurality of terminals 100, 300a, 300b, and 300c, and a relay device 200.

FIG. 1 only illustrates components of the communication system 10 related to the current embodiment. Accordingly, it would be obvious to one of ordinary skill in the art that the communication system 10 may further include general-purpose components in addition to the components shown in FIG. 1. For example, the communication system 10 of FIG. 1 may further include a server or another terminal in addition to the plurality of terminals 100, 300a, 300b, and 300c, and the relay device 200.

From among the plurality of terminals 100, 300a, 300b, and 300c, a first terminal 100 is a terminal that transmits a screen image to be shared during screen sharing with a plurality of second terminals 300a, 300b, and 300c. Here, the screen image denotes an image output to a screen of the first terminal 100. The first terminal 100 according to an embodiment may generate the screen image by capturing the image output to the screen of the first terminal 100.

Also, according to another embodiment, the screen image may be an image output to a screen of an external device connected to the first terminal 100. At this time, the first terminal 100 may receive an image obtained by capturing the screen of the external device, from the external device.

Meanwhile, the first terminal 100 may encode the screen image according to certain encoding quality. Here, encoding quality may include at least one of a frame rate and resolution. However, this is only an embodiment, and according to another example, the encoding quality may include not only the frame rate and the resolution, but also codec setting information, such as a bit rate, a forward error correction (FEC) rate, and intra refresh applicability.

Meanwhile, the first terminal 100 may receive information about encoding quality of the screen image from the relay device 200. The first terminal 100 may encode the screen image of the first terminal based on the information about the encoding quality, which is received from the relay device 200.

The first terminal 100 according to an embodiment may transmit the encoded screen image to the relay device 200. For example, the first terminal 100 may transmit the screen image encoded in data units, such as packets and segments, to the relay device 200.

The relay device 200 controlling the screen sharing between the plurality of terminals 100, 300*a*, 300*b*, and 300*c* may receive the encoded screen image from the first terminal 100. Also, the relay device 200 may transmit the received screen image to each of the plurality of second terminals 300*a*, 300*b*, and 300*c*.

Meanwhile, the relay device 200 may determine the encoding quality of the screen image of the first terminal 100, which is encoded by the first terminal 100. According to an embodiment, the relay device 200 may determine the encoding quality of the screen image of the first terminal 100 based on performance of the first terminal 100 and a status of a network to which each of the plurality of second terminals 300*a*, 300*b*, and 300*c* is included.

Here, performance information about screen image transmission of the first terminal 100 may include information about central processing unit (CPU) usage of the first terminal 100, an encoding processing time, and a frame rate. Also, status information of the network to which each of the plurality of second terminals 300*a*, 300*b*, and 300*c* is included may include information about a round trip time (RTT), a data exchange delay time, and a data loss rate. However, this is only an example, and the status information of the network to which each of the plurality of second terminals 300*a*, 300*b*, and 300*c* is included may further include other type of information indicating a degree of congestion of the network to which each of the second terminals 300*a*, 300*b*, and 300*c* is included.

Meanwhile, according to another embodiment, the relay device 200 may determine the encoding quality of the screen image of the first terminal 100 based on the performance information about the screen image transmission of the first terminal 100 and the status information of the network to which each of the plurality of second terminals 300*a*, 300*b*, and 300*c* is included. For example, when wireless communication is set between the relay device 200 and the first terminal 100, the relay device 200 may prevent congestion of a network between the relay device 200 and the first terminal 100 in consideration of status information of a network to which the first terminal 100 is included.

The plurality of second terminals 300*a*, 300*b*, and 300*c* according to an embodiment are terminals that receive a screen image to be shared during the screen sharing with the first terminal 100. Each of the plurality of second terminals 300*a*, 300*b*, and 300*c* may receive the screen image of the first terminal 100 from the relay device 200. When each of the plurality of second terminals 300*a*, 300*b*, and 300*c* receives the screen image of the first terminal 100, each of the plurality of second terminals 300*a*, 300*b*, and 300*c* may share an image corresponding to the screen image of the first terminal 100.

Meanwhile, the plurality of terminals 100, 300*a*, 300*b*, and 300*c* according to an embodiment may include a personal computer (PC), a smart phone, a tablet device, and a wearable device. Also, the relay device 200 may include a server, a PC, a smart phone, a tablet device, and a wearable device.

Figure 2:
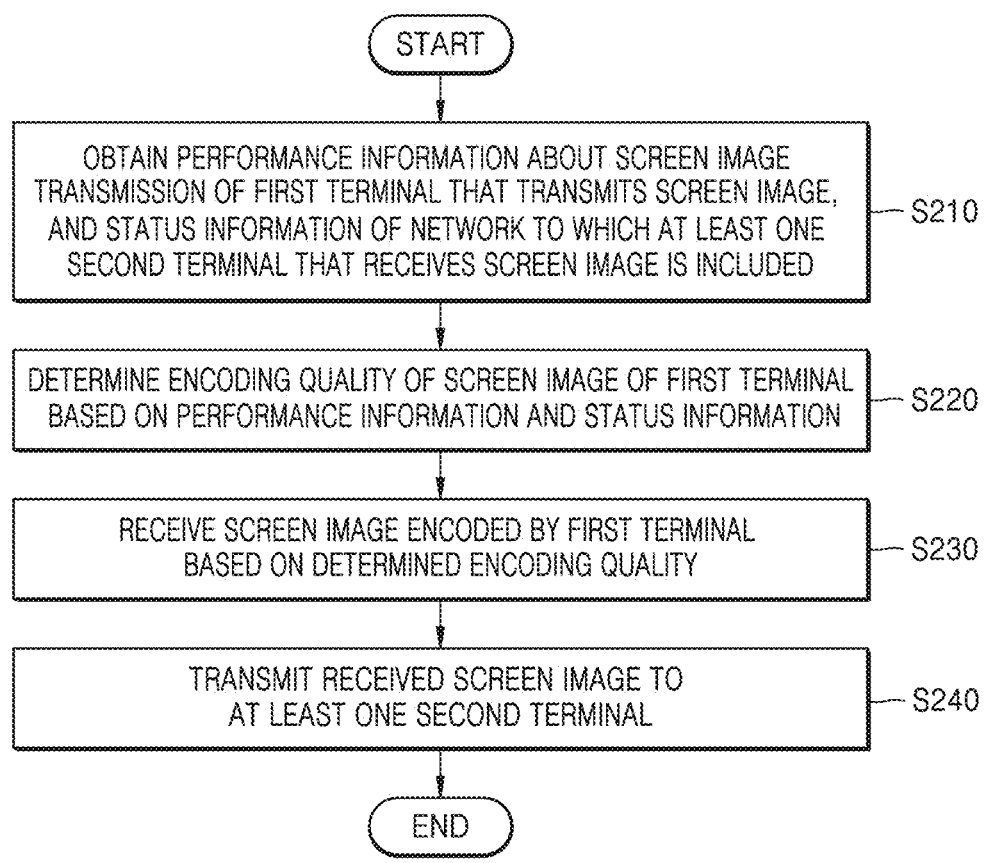
FIG. 2 is a flowchart for describing a method of controlling, by a relay device, screen sharing between a plurality of terminals, according to an embodiment.

FIG. 2 is a flowchart for describing a method of controlling, by a relay device, screen sharing between a plurality of terminals, according to an embodiment.

In operation S210, the relay device obtains performance information about screen image transmission of a first terminal that transmits a screen image, and status information of a network to which at least one second terminal that receives the screen image is included.

The relay device according to an embodiment may obtain the performance information about the screen image transmission of the first terminal, from the first terminal. For example, the relay device may obtain information about CPU usage of the first terminal 100, an encoding processing time, and a frame rate. At least one protocol from among a real time control protocol (RTCP), a real time protocol (RTP), a session initiation protocol (SIP), and an extensible messaging and presence protocol (XMPP) may be used by the relay device to obtain the performance information about the screen image transmission of the first terminal.

Also, the relay device according to an embodiment may obtain the status information of the network to which the at least one second terminal is included, from the at least one second terminal that receives the screen image of the first terminal. For example, the relay device may obtain information about at least one of RTT of the network to which at least one second terminal is included, a data exchange delay time, and a data loss rate. The relay device may receive the status information of the network to which the at least one second terminal is included, based on at least one protocol from among RTCP, RTP, extension SIP, and XMPP.

In operation S220, the relay device determines encoding quality of the screen image of the first terminal, based on the performance information and the status information.

The relay device according to an embodiment may determine a bit rate for the screen image transmission of the first terminal, which may not generate congestion in the network to which the at least one second terminal is included, based on the status information received from the at least one second terminal. Here, the relay device may pre-store a pre-set bit rate value according to a value of at least one of RTT included in the status information, data exchange delay time, and a data loss rate. The relay device may determine the bit rate for the screen image transmission of the first terminal according to the received status information, based on pre-stored information.

Also, the relay device may determine encoding quality of the screen image to be encoded by the first terminal, by using the determined bit rate and the performance information about the screen image transmission of the first terminal. For example, when fps_1 denotes a frame rate set according to the determined bit rate and fps_2 denotes a frame rate transmittable by the first terminal, the relay device may select a lower frame rate from among fps_1 and fps_2.

However, this is only an example, and the relay device may determine resolution of the screen image to be encoded by the first terminal, an FEC rate, and intra refresh application, based on the determined bit rate.

The relay device according to an embodiment may determine the encoding quality in consideration of not only the status information of the network to which the at least one second terminal is included, but also the performance information about the screen image transmission of the first terminal, so as to control exchange of the screen image between a plurality of terminals such that the screen image having high quality is shared within a range of an allowed network.

In operation S230, the relay device receives the screen image encoded by the first terminal based on the determined encoding quality.

The relay device according to an embodiment may transmit information about the determined encoding quality to the first terminal. Here, the relay device may set a channel for transmitting, to the first terminal, the information about the encoding quality, separately from a channel for receiving the screen image from the first terminal. However, this is only an embodiment, and the relay device may transmit the information about the determined encoding quality to the first terminal by using the channel for receiving the screen image from the first terminal.

The first terminal may determine at least one of a frame rate for encoding the screen image of the first terminal, resolution, an FEC rate, and infra refresh application, based on the information about the encoding quality received from the relay device.

The relay device according to an embodiment may receive the screen image encoded according to the information about the encoding quality, from the first terminal. For example, the relay device may receive the screen image encoded according to data units, such as packets and segments, from the first terminal.

In operation S240, the relay device transmits the received screen image to the at least one second terminal.

The relay device according to an embodiment may transmit the received screen image to each of the at least one second terminal. Upon receiving the screen image from the relay device, the at least one second terminal may share a screen image corresponding to the screen image of the first terminal.

Figure 3:
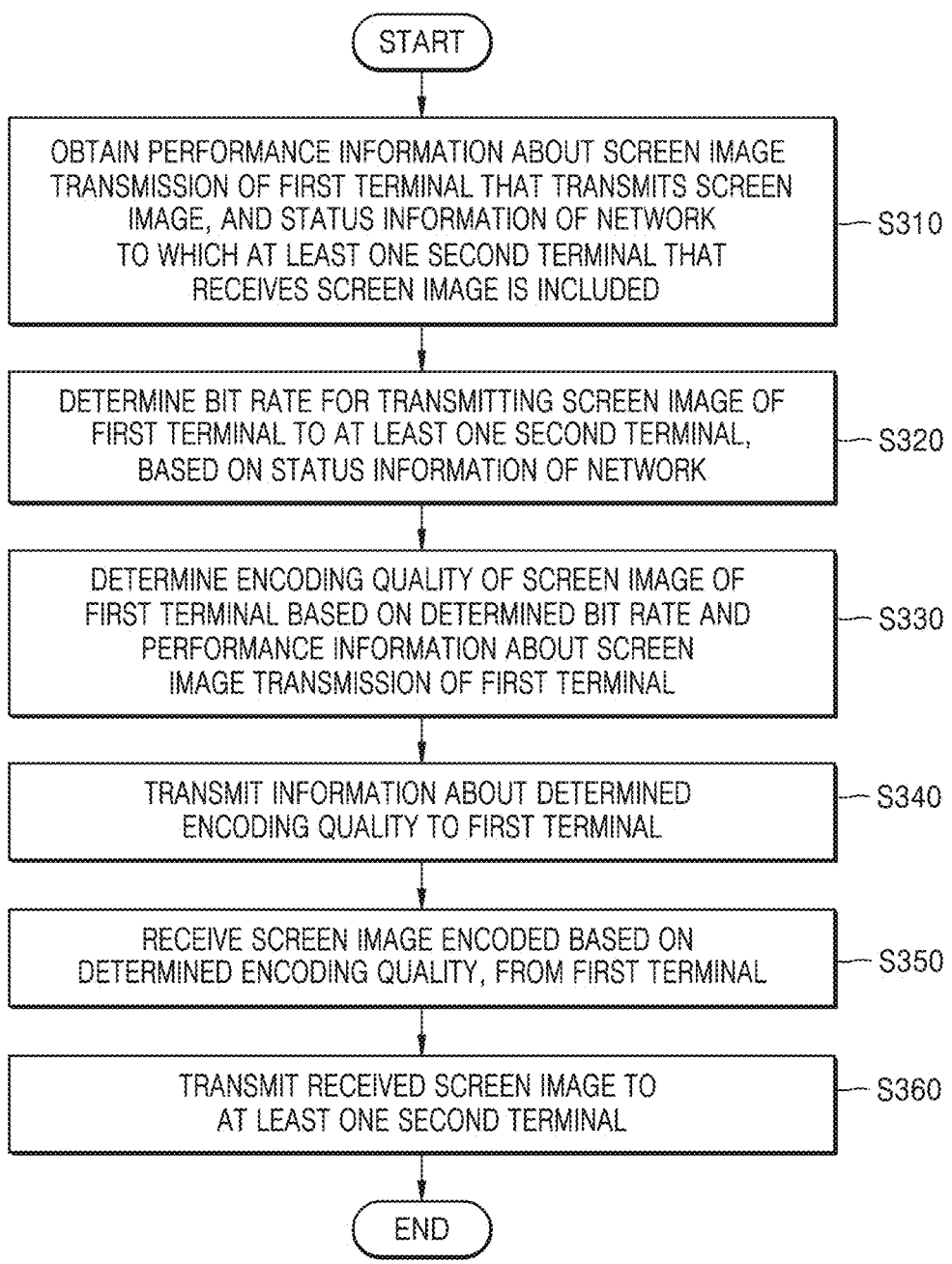
FIG. 3 is a flowchart for describing, in detail, a method of controlling, by a relay device, screen sharing between a plurality of terminals, according to an embodiment.

FIG. 3 is a flowchart for describing, in detail, a method of controlling, by a relay device, screen sharing between a plurality of terminals, according to an embodiment.

In operation S310, the relay device may obtain performance information about screen image transmission of a first terminal that transmits a screen image, and status information of a network to which at least one second terminal that receives the screen image is included.

Operation S310 may correspond to operation S210 of FIG. 1.

In operation S320, the relay device may determine a bit rate for transmitting the screen image of the first terminal to the at least one second terminal, based on the status information.

The relay device according to an embodiment may predict a degree of congestion of the network to which the at least one second terminal is included based on information about at least one of RTT, a data exchange delay time, and a data loss rate, which are included in the status information. The relay device may determine the bit rate that may not generate congestion in the network to which the at least one second terminal is included, based on the predicted degree of congestion.

In operation S330, the relay device may determine encoding quality of the screen image of the first terminal, based on the determined bit rate and the performance information about the screen image transmission of the first terminal.

When the relay device sets a frame rate of the screen image of the first terminal to be 15 fps based on the determined bit rate, the performance of the first terminal may not be able to process the set frame rate. The relay device according to an embodiment may determine the encoding quality of the screen image of the first terminal based on the performance information about the screen image transmission of the first terminal, thereby preventing quality of the screen image shared between a plurality of terminals from deteriorating.

For example, when a frame rate according to the determined bit rate is 15 fps, and a frame rate of the screen image processable by the first terminal is 3 fps, the relay device may select a frame rate for encoding the screen image of the first terminal to be 3 fps.

Meanwhile, the relay device may determine not only the frame rate, but also codec setting information about resolution, an FEC rate, and infra refresh applicability based on the determined bit rate and the performance information about the screen image transmission of the first terminal.

In operation S340, the relay device may transmit information about the determined encoding quality to the first terminal.

The relay device according to an embodiment may transmit the information about the determined encoding quality to the first terminal based on at least one protocol from among RTCP, RTP, extension SIP, and XMPP.

In operation S350, the relay device may receive the screen image encoded based on the determined encoding quality, from the first terminal.

The relay device according to an embodiment may receive the encoded screen image according to data units, such as packets and segments, from the first terminal.

In operation S360, the relay device may transmit the received screen image to the at least one second terminal.

Operation S360 may correspond to operation S240 of FIG. 2.

Figure 4:
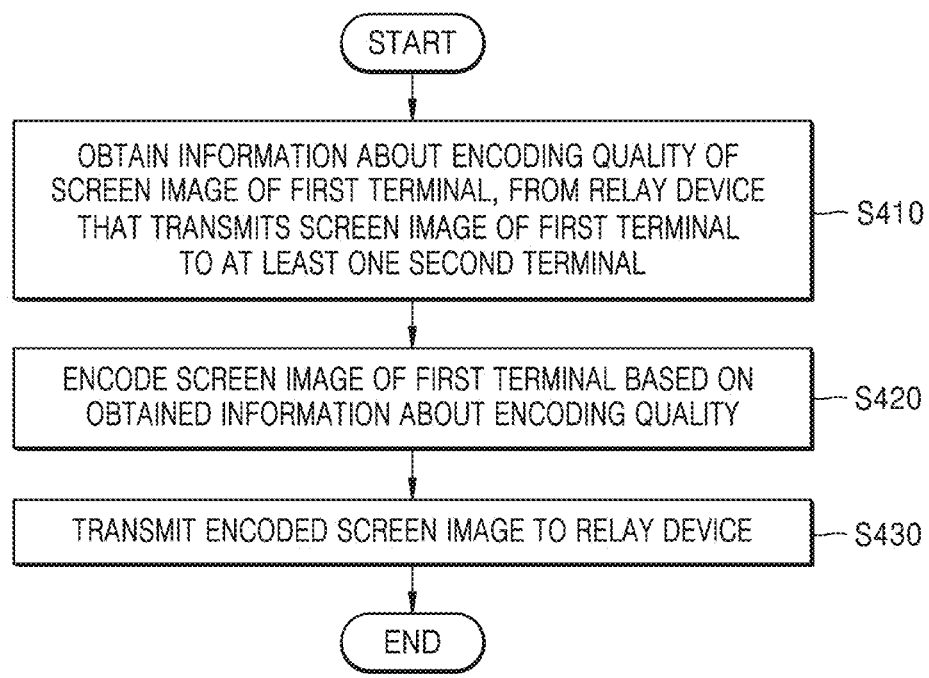
FIG. 4 is a flowchart for describing a method of controlling, by a first terminal, screen sharing between a plurality of terminals, according to an embodiment.

FIG. 4 is a flowchart for describing a method of controlling, by a first terminal, screen sharing between a plurality of terminals, according to an embodiment.

In operation S410, the first terminal obtains information about encoding quality of a screen image of the first terminal from a relay device that transmits the screen image of the first terminal to at least one second terminal. Here, the first terminal is a terminal that transmits the screen image, from among the plurality of terminals that share the screen image.

The first terminal according to an embodiment may obtain, from the relay device, the information about the encoding quality determined based on performance information about screen image transmission of the first terminal and status information of a network to which at least one second terminal that receives the screen image of the first terminal is included.

In operation S420, the first terminal encodes the screen image of the first terminal based on the obtained information about the encoding quality.

The first terminal according to an embodiment may generate the screen image by capturing an image output to a screen of the first terminal. Also, the first terminal may encode the screen image according to a frame rate specified based on the information about the encoding quality. However, this is only an embodiment, and the first terminal may determine at least one of resolution, an FEC rate, and infra refresh applicability, based on the information about the encoding quality.

In operation S430, the first terminal transmits the encoded screen image to the relay device.

The first terminal according to an embodiment may transmit the screen image to the relay device in data units, such as packets and segments.

Meanwhile, the first terminal may be fed back, in real-time, information about the changing encoding quality as a status of the network to which the at least one second terminal sharing the screen image with the first terminal is included is changed. When the encoding quality is changed, the first terminal may transmit the screen image encoded according to the changed encoding quality to the relay device.

Figure 5:
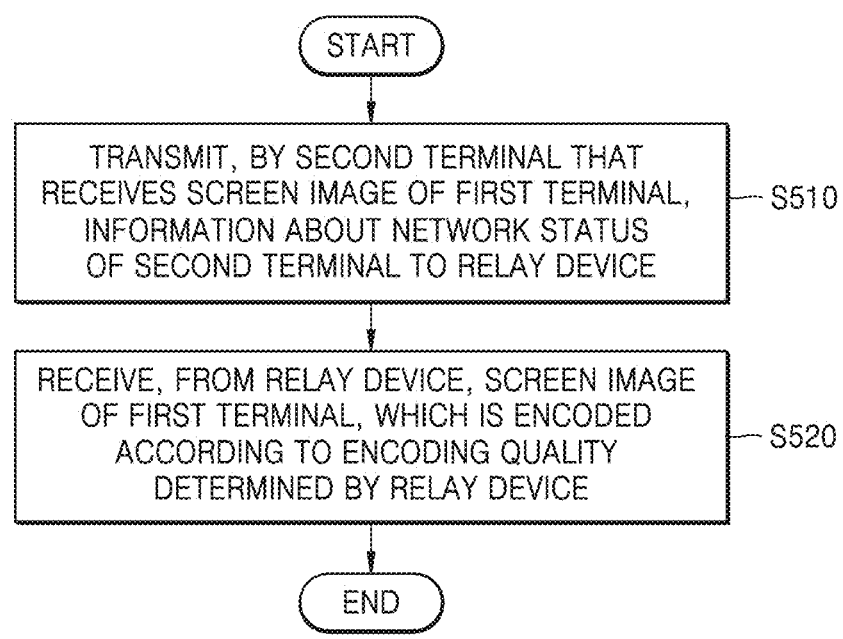
FIG. 5 is a flowchart for describing a method of controlling, by a second terminal, screen sharing between a plurality of terminals, according to an embodiment.

FIG. 5 is a flowchart for describing a method of controlling, by a second terminal, screen sharing between a plurality of terminals, according to an embodiment.

In operation S510, the second terminal transmits information about a network status of the second terminal to a relay device.

The second terminal according to an embodiment may transmit status information of a network to which the second terminal is included to the relay device, based on at least one protocol from among RTCP, RTP, extension SIP, and XMPP. Here, the status information of the network to which the second terminal is included may include information about at least one of RTT, a data exchange delay time, and a data loss rate.

In operation S520, the second terminal may receive, from the relay device, a screen image of a first terminal, which is encoded according to encoding quality determined by the relay device.

The second terminal according to an embodiment may receive, from the relay device, the screen image encoded by the first terminal according to data units, such as packets and segments.

Figure 6:
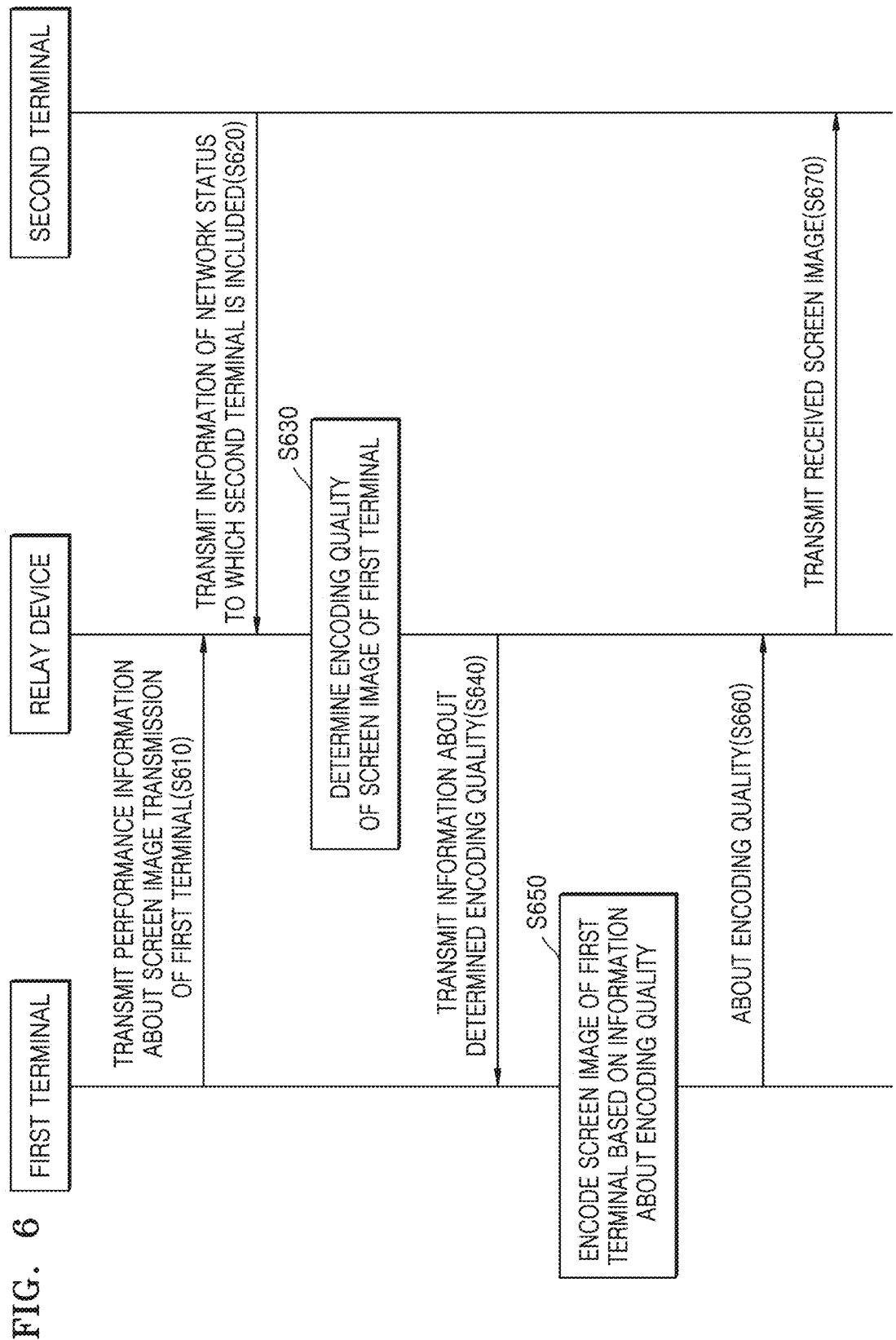
FIG. 6 is a flowchart for describing operations of a communication system for controlling screen sharing between a plurality of terminals, according to an embodiment.

FIG. 6 is a flowchart for describing operations of a communication system for controlling screen sharing between a plurality of terminals, according to an embodiment.

In FIG. 6, only operations of one second terminal are described for convenience of description, but this is only an embodiment, and the communication system may include a plurality of second terminals. When the communication system includes the plurality of second terminals, operations of each of the plurality of second terminals may correspond to the operations of the second terminal described with reference to FIG. 6.

In operation S610, a first terminal may transmit performance information about screen image transmission of the first terminal to a relay device.

The first terminal according to an embodiment may separately set a channel for transmitting performance information, in addition to a channel for transmitting the screen image to the relay device. However, this is only an embodiment, and the first terminal may transmit the performance information through the channel for transmitting the screen image to the relay device.

In operation S620, the second terminal may transmit information of a network status to which the second terminal is included, to the relay device.

Meanwhile, an order of performing operations S610 and S620 may be changed.

In operation S630, the relay device may determine encoding quality of the screen image of the first terminal based on the performance information about the screen image transmission of the first terminal, and the information of the network status to which the second terminal is included.

In operation S640, the relay device may transmit information about the determined encoding quality to the first terminal.

In operation S650, the first terminal may encode the screen image of the first terminal based on the information about the encoding quality.

For example, the first terminal may encode the screen image of the first terminal based on a frame rate and resolution, which are included in the information about the encoding quality.

In operation S660, the first terminal may transmit the encoded screen image to the relay device.

In operation S670, the relay device may transmit the received screen image to the second terminal.

By transmitting the screen image received by the relay device according to an embodiment to the second terminal, the first and second terminals may share corresponding screen images.

Figure 7:
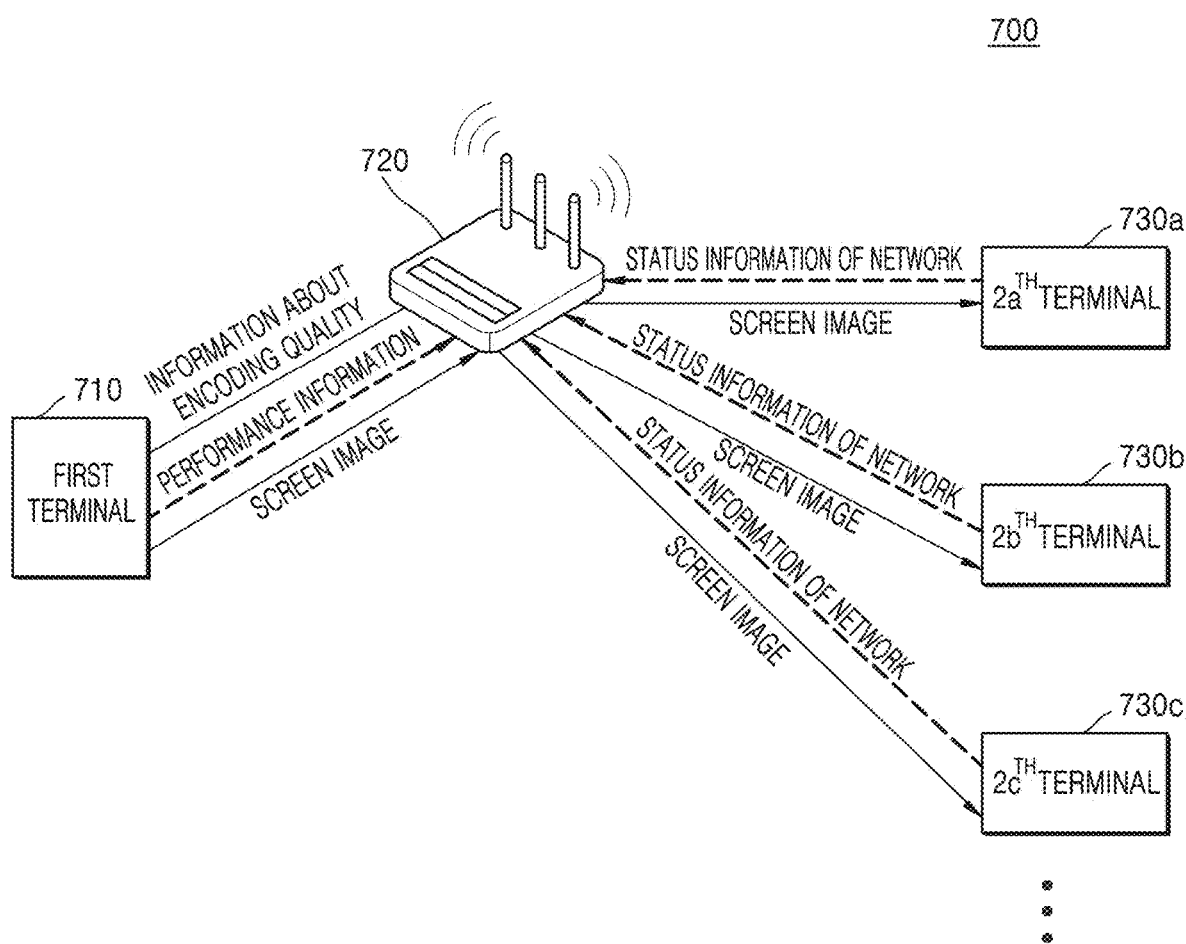
FIG. 7 is a diagram for describing a method of controlling, by an access point (AP) device as a relay device, screen sharing between a plurality of terminals, according to an embodiment.

FIG. 7 is a diagram for describing a method of controlling, by an access point (AP) device as a relay device, screen sharing between a plurality of terminals, according to an embodiment.

According to an embodiment of FIG. 7, an AP device 720 may perform operations corresponding to those of the relay device described with reference to FIG. 2.

From among a plurality of terminals 710, 730a, 730b, and 730c sharing a screen image, a first terminal 710 that transmits the screen image may transmit internet protocol (IP) information of a plurality of second terminals 730a, 730b, and 730c that receive the screen image, to the AP device 720. Also, the first terminal 710 may transmit performance information about screen image transmission of the first terminal 710 to the AP device 720. The performance information about the screen image transmission of the first terminal 710 may be used by the AP device 720 to determine encoding quality of the screen image of the first terminal 710.

Meanwhile, the AP device 720 according to an embodiment may receive status information of a network to which each of the plurality of second terminals 730a, 730b, and 730c is included, from each of the plurality of second terminals 730a, 730b, and 730c. For example, the AP device 720 may receive the status information of the network to which each of the plurality of second terminals 730a, 730b, and 730c is included from each of the plurality of second terminals 730a, 730b, and 730c through RTCP.

The AP device 720 may determine the encoding quality of the screen image of the first terminal 710 based on the performance information about the screen image transmission of the first terminal 710 and the status information of the network to which each of the plurality of second terminals 730a, 730b, and 730c is included. The AP device 720 may transmit information about the determined encoding quality to the first terminal 710.

The first terminal 710 may encode the screen image of the first terminal 710 based on the information about the encoding quality received from the AP device 720. The first terminal 710 may transmit the encoded screen image to the AP device 720.

The AP device 720 according to an embodiment may transmit the screen image received from the first terminal 710 to each of the plurality of second terminals 730a, 730b, and 730c. The AP device 720 may transmit the screen image received from the first terminal 710 to each of the plurality of second terminals based on the IP information pre-received from the first terminal 710.

Figure 8:
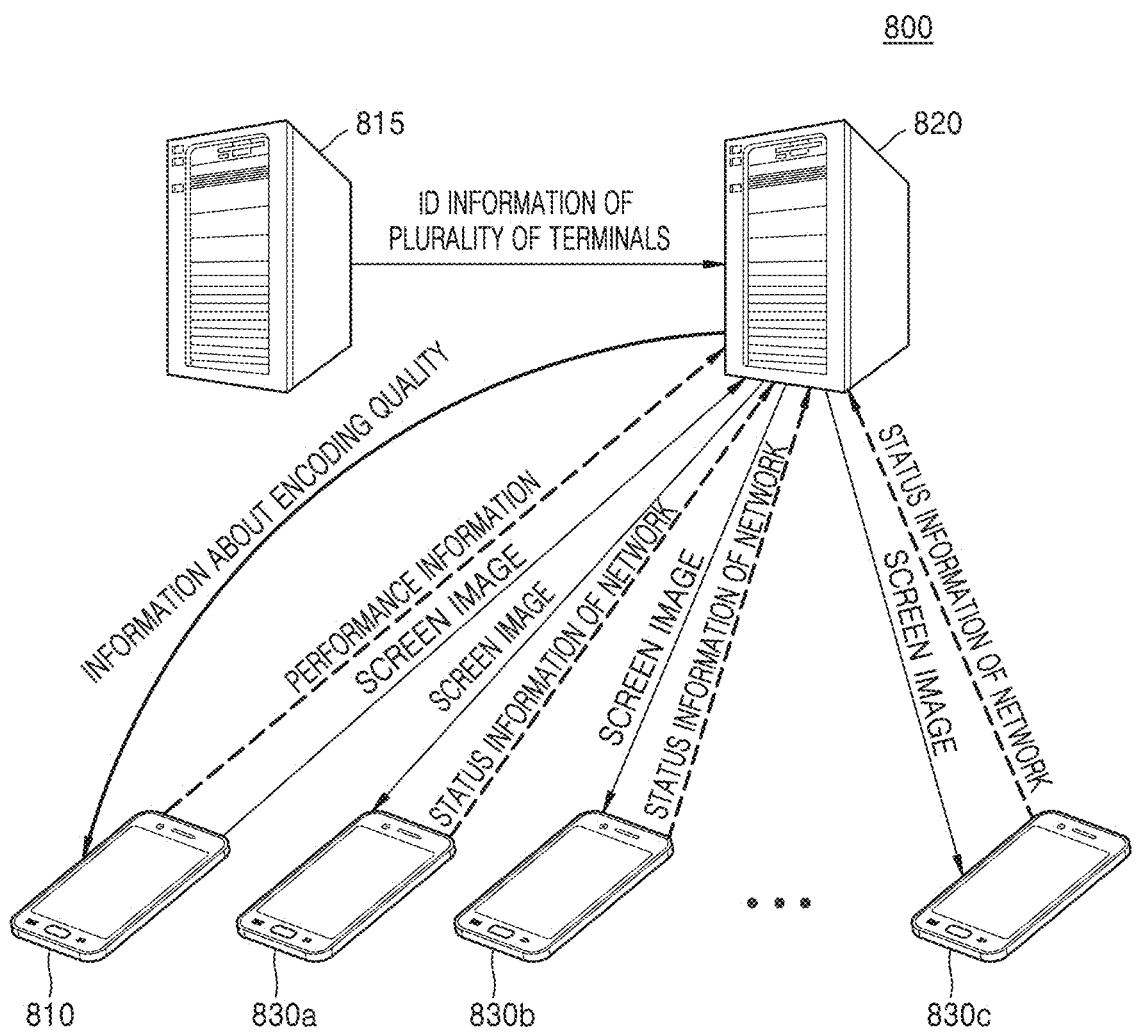
FIG. 8 is a diagram for describing a method of controlling, by a relay server, screen sharing between a plurality of terminals, when a push to talk (PTT) service is performed by a communication system, according to an embodiment.

FIG. 8 is a diagram for describing a method of controlling, by a relay server 820, screen sharing between a plurality of terminals 810, 830a, 830b, and 830c, when a push to talk (PTT) service is performed by a communication system 800, according to an embodiment.

The communication system 800 according to an embodiment may include the plurality of terminals 810, 830a, 830b, and 830c, a signaling server 815, and the relay server 820.

FIG. 8 only illustrates components of the communication system 800, which are related to the current embodiment. Accordingly, it would be obvious to one of ordinary skill in the art that the communication system 800 may further include general-purpose components in addition to the components shown in FIG. 8.

Referring to FIG. 8, the PTT service performed by the communication system 800 is a unidirectional image transmitting service, wherein a screen image of a first terminal 810 may be transmitted to each of a plurality of second terminals 830a, 830b, and 830c through the relay server 830.

Meanwhile, in the communication system 800, the signaling server 815 may obtain identification (ID) information of the first terminal 810 and ID information of the plurality of second terminals 830a, 830b, and 830c. Here, the ID information may include at least one of IP information and port information. Also, the signaling server 815 may provide the obtained ID information of the first terminal 810 and the plurality of second terminals 830a, 830b, and 830c to the relay server 820.

The relay server 820 according to an embodiment may transmit a screen image of the first terminal 810 received from the first terminal 810 to each of the plurality of second terminals 830a, 830b, and 830c, based on the ID information of the first terminal 810 and the plurality of second terminals 830a, 830b, and 830c received from the signaling server 815.

Meanwhile, the relay server 820 according to an embodiment may receive, from the first terminal 810, performance information about screen image transmission of the first terminal 810. Also, the relay server 820 may receive status information of a network to which each of the plurality of second terminals 830a, 830b, and 830c is included, from each of the plurality of second terminals 830a, 830b, and 830c. For example, the relay server 820 may receive the status information of the network to which each of the plurality of second terminals 830a, 830b, and 830c is included, from each of the plurality of second terminals 830a, 830b, and 830c through RTCP.

The relay server 820 may determine encoding quality of the screen image of the first terminal 810, based on the performance information about the screen image transmission of the first terminal 810 and the status information of the network to which each of the plurality of second terminals 830a, 830b, and 830c is included. The relay server 820 may transmit information about the determined encoding quality to the first terminal 810.

The first terminal 810 may encode the screen image of the first terminal 810 based on the information about the encoding quality received from the relay server 820. The first terminal 810 may transmit the encoded screen image to the relay server 820. The relay server 820 may transmit the screen image received from the first terminal 810 to each of the plurality of second terminals 830a, 830b, and 830c based on the ID information of each of the plurality of second terminals 830a, 830b, and 830c received from the signaling server 815.

Figure 9:
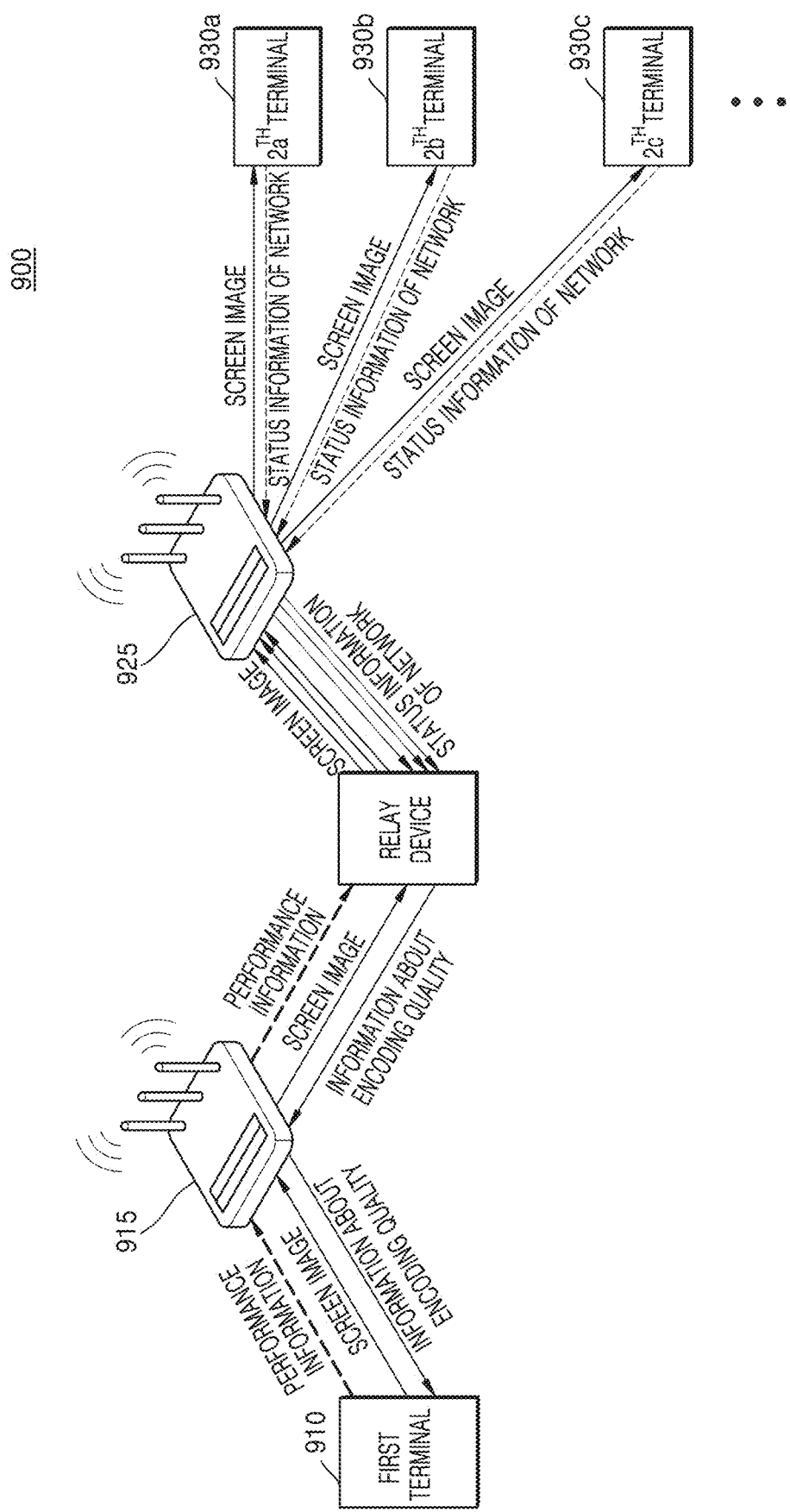
FIG. 9 is a diagram for describing a method of controlling, by a relay device connected to a plurality of AP devices via wires in a communication system, screen sharing between a plurality of terminals, according to an embodiment.

FIG. 9 is a diagram for describing a method of controlling, by a relay device 920 connected to a plurality of AP devices 915 and 925 via wires in a communication system 900, screen sharing between a plurality of terminals 910, 930a, 930b, and 930c, according to an embodiment.

The communication system 900 according to an embodiment may include the plurality of terminals 910, 930a, 930b, and 930c, the plurality of AP devices 915 and 925, and the relay device 920.

FIG. 9 only illustrates components of the communication system 900, which are related to the current embodiment. Accordingly, it would be obvious to one of ordinary skill in the art that the communication system 900 may further include general-purpose components in addition to the components shown in FIG. 9.

Referring to FIG. 9, in the communication system 900, the relay device 920 may be connected to a first AP device 915 and a second AP device 925 via wires.

In the communication system 900 according to an embodiment, IP address information of a first terminal 910 may be pre-set in the first AP device 915. The first AP device 915 may set a communication session with the first terminal 910 based on the AP address information of the first terminal 910. When the communication session with the first terminal 910 is set, the first AP device 915 may receive an encoded screen image of the first terminal 910 from the first terminal 910. The first AP device 915 may transmit the received screen image to the relay device 920.

The relay device 920 according to an embodiment may transmit the received screen image to each of a plurality of second terminals 930a, 930b, and 930c through the second AP device 925. IP address information of each of the plurality of second terminals 930a, 930b, and 930c may be pre-set in the second AP device 925. The second AP device 925 may transmit the screen image of the first terminal 910, which is received from the relay device 920, to each of the plurality of second terminals 930a, 930b, and 930c, based on the IP address information of each of the plurality of second terminals 930a, 930b, and 930c.

Meanwhile, the relay device 920 according to an embodiment may receive performance information about screen image transmission of the first terminal 910 from the first terminal 910 through the first AP device 915. Also, the relay device 920 may receive status information of a network to which each of the plurality of second terminals 930a, 930b, and 930c is included from each of the plurality of second terminals 930a, 930b, and 930c through the second AP device 925.

The relay device 920 may determine encoding quality of the screen image of the first terminal 910 based on the performance information about the screen image transmission of the first terminal 910 and the status information of the network to which each of the plurality of second terminals 930a, 930b, and 930c is included. The relay device 920 may transmit information about the determined encoding quality to the first terminal 910 through the first AP device 915.

Meanwhile, in the communication system 900 according to an embodiment, the relay device 920 may perform wired communication with each of the first AP device 915 and the second AP device 925. When the relay device 920 performs the wired communication with each of the first AP device 915 and the second AP device 925, bandwidth usage of a wireless network required to control the screen sharing between the plurality of terminals 910, 930a, 930b, and 930c may be reduced.

Figure 10:
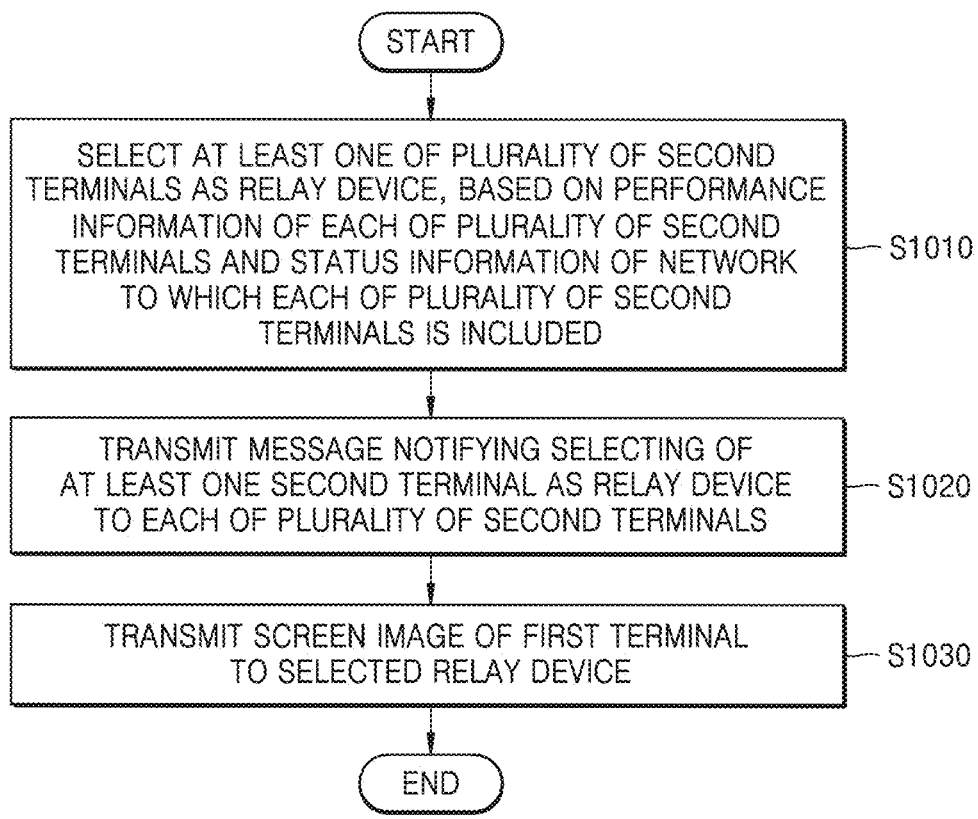
FIG. 10 is a flowchart for describing a method of selecting, by a first terminal, at least one of a plurality of second terminals as a relay device, and transmitting a screen image of the first terminal to a selected relay device in a communication system, according to an embodiment.

FIG. 10 is a flowchart for describing a method of selecting, by a first terminal, at least one of a plurality of second terminals as a relay device, and transmitting a screen image of the first terminal to a selected relay device in a communication system, according to an embodiment.

In operation S1010, the first terminal may select one of the plurality of second terminals as the relay device, based on performance information of the plurality of second terminals that receive the screen image of the first terminal and status information of a network to which each of the plurality of second terminals is included.

The first terminal according to an embodiment may transmit the screen image of the first terminal to each of the plurality of second terminals. Here, the first terminal may transmit the screen image of the first terminal to each of the plurality of second terminals within a range of pre-set transmission bandwidth.

Meanwhile, the first terminal according to an embodiment may select at least one of the plurality of second terminals as the relay device when a bandwidth required to transmit the screen image exceeds a pre-set bandwidth. For example, when a data amount of the screen image increases or the number of second terminals receiving the screen image of the first terminal increases, the bandwidth required to transmit the screen image may exceed the pre-set bandwidth. In this case, the first terminal may transmit the screen image of the first terminal to each of other second devices through the relay device selected from among the plurality of second terminals.

The first terminal may select the relay device based on the performance information of the plurality of second terminals and the status information of the network to which each of the plurality of second terminals is included, which are obtained from the plurality of second terminals.

For example, the first terminal may select, as the relay device, at least one second terminal having performance and a status of a network corresponding to a pre-set reference range, based on the performance information of the plurality of second terminals and the status information of the network to which each of the second terminals is included. Here, the reference range may be set in relation to RTT, a data exchange delay time, a data loss rate, a frame rate, resolution, and a processing time of an encoder.

Also, according to another example, the first terminal may determine orders of the plurality of second terminals according to performance and a status of a network, and select some of the second terminals having high orders as the relay device. Here, the first terminal may determine the orders of the plurality of second terminals according to the RTT, the data exchange delay time, the data loss rate, the frame rate, the resolution, and the processing time of the encoder.

Meanwhile, the first terminal may select a number M of relay devices based on a number N of the plurality of second terminals, throughput TH of a screen image transmittable from the second terminal, and a maximum bit rate B max of the screen image. For example, the first terminal may select the number M of the relay devices within a range determined according to Equation 1.

$$B\ max * N/TH < M < TH/B\ max \qquad \text{[Equation 1]}$$

Also, according to another embodiment, the first terminal may determine the number of relay devices through Equation 2 in order to equally set a number of relay devices connected to the first terminal and a number of second terminals connected according to the relay devices.

$$N/M = M \qquad \text{[Equation 2]}$$

However, the above embodiments are only examples for selecting, by the first terminal, the number of relay devices, and thus the present disclosure is not limited thereto.

In operation S1020, the first terminal may transmit a message notifying the selecting of the relay device to each of the plurality of second terminals. Here, the message notifying the selecting of the relay device may include ID information of the selected relay device and mode information indicating that a mode of screen sharing is changed to a relay mode in which the screen image of the first terminal is transmitted through the relay device. The ID information of the relay device may include information about at least one of an IP address and a port number of the relay device. However, this is only an example, and the ID information of the relay device is not limited thereto.

In operation S1030, the first terminal may transmit the screen image of the first terminal to the selected relay device. According to an embodiment, the screen image transmitted from the first terminal may be transmitted to each of the plurality of second terminals through the selected relay device.

The first terminal according to an embodiment may transmit the screen image of the first terminal after a pre-set period of time from a point of time when each of the plurality of second terminals checks the reception of the message notifying the selecting of the relay device. For example, the first terminal may transmit the screen image of the first terminal to the relay device after A ms, after a response message that the message notifying the selecting of the relay device is received by each of the plurality of second terminals is received.

Meanwhile, the first terminal may receive information about encoding quality of the screen image of the first terminal from the selected relay device. The relay device may determine the encoding quality of the screen image of the first terminal based on performance information about screen image transmission of the first terminal obtained from the first terminal and status information of a network to which each of other second terminals is included. A method of determining, by the relay device, the encoding quality of the screen image of the first terminal may correspond to that described above with reference to FIG. 3.

When the relay device is selected from among the plurality of second terminals, the first terminal according to an embodiment may transmit information about a reproduction time of the screen image to each of the plurality of second terminals. Accordingly, when the screen image of the first terminal is transmitted through the relay device in the communication system, a screen image shared between the second terminal selected as the relay device and the other second terminals may be synchronized.

The first terminal according to an embodiment may share the screen image of the first terminal with the plurality of second terminals by selecting one of the relay mode, in which the screen image is transmitted to each of the other second terminals through the relay device selected from among the plurality of second terminals, and a direct mode, in which the screen image is transmitted to each of the plurality of second terminals. For example, when the number of second terminals that receive the screen image of the first terminal is equal to or higher than a threshold value, the first terminal may select the relay mode, and when the number of second terminals that receive the screen image of the first terminal is lower than the threshold value, the first terminal may select the direct mode.

Meanwhile, the first terminal may share the screen image of the first terminal with the plurality of second terminals by selectively using the relay mode and the direct mode, by maintaining a communication session with the other second terminals that are not selected as the relay device, even after at least one of the plurality of second terminals is selected as the relay device.

Also, in a transfer section, in which the relay mode and the direct mode are switched, the screen image of the first terminal may be transmitted to all of the relay device and the plurality of second terminals, thereby preventing the screen image of the first terminal from being lost according to mode conversion.

Figure 11:
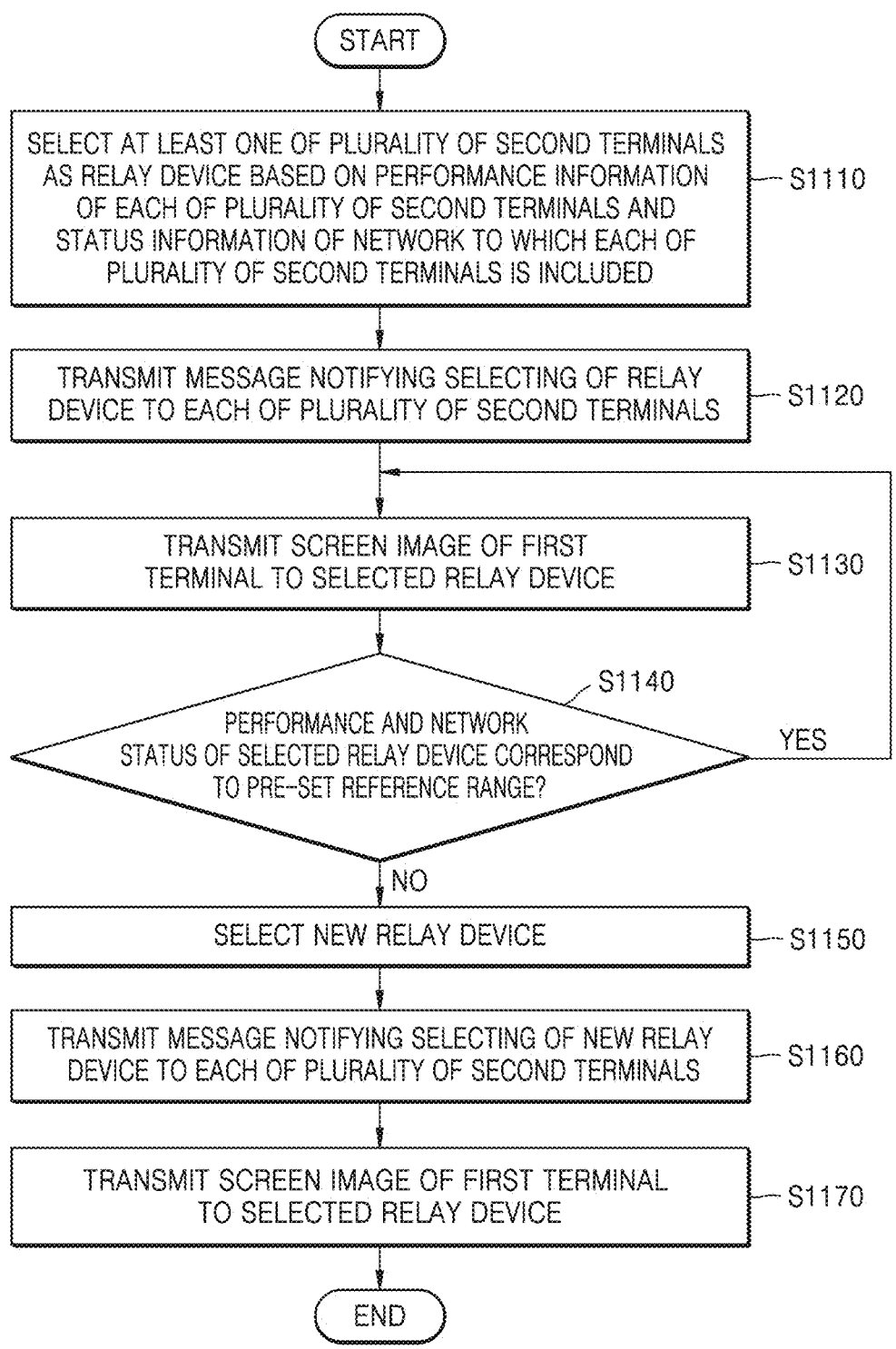
FIG. 11 is a flowchart for describing a method of reselecting a relay device according to performance of each of a plurality of second terminals and a status of a network, to which each of the plurality of second terminals is included, in a communication system, according to an embodiment.

FIG. 11 is a flowchart for describing a method of reselecting a relay device according to performance of each of a plurality of second terminals and a status of a network, to which each of the plurality of second terminals is included, in a communication system, according to an embodiment.

In operation S1110, a first terminal may select any one of the plurality of second terminals as the relay device based on performance information of the plurality of second terminals that receive a screen image of the first terminal and status information of the network to which each of the plurality of second terminals is included.

Meanwhile, operation S1110 may correspond to operation S1010 described above with reference to FIG. 10.

In operation S1120, the first terminal may transmit a message notifying selecting of the relay device to each of the plurality of second terminals. Here, second terminals that are not selected as the relay device from among the plurality of second terminals may set a communication session with the relay device through ID information of the relay device, which is included in the message notifying the selecting of the relay device.

Meanwhile, operation S1120 may correspond to operation S1020 described above with reference to FIG. 10.

In operation S1130, the first terminal may transmit the screen image of the first terminal to the selected relay device. The first terminal may transmit the screen image of the first terminal, which is encoded according to pre-set encoding quality, to the selected relay device.

Meanwhile, the encoding quality of the screen image of the first terminal may be updated based on information about the encoding quality received from the relay device. The relay device may determine the encoding quality based on the status information of the network to which the second terminal that receive the screen image of the first terminal is included and performance information about screen image transmission of the first terminal. Also, when a status of the network to which the second terminal is included is changed, the encoding quality determined by the relay device may be changed.

In operation S1140, the first terminal may determine whether performance and a network status of the selected relay device correspond to a pre-set reference range.

The first terminal according to an embodiment may be fed back information about the performance of the selected relay device and a status of a network to which the selected relay device is included. Here, the status of the network to which the relay device is included may be changed according to time. For example, the network status between the second terminals connected to the relay device may be changed when a degree of congestion increases or when the relay device is turned off. Also, the network status may be changed when the relay device is outside a network range. Also, the network status may be changed when a bandwidth required for the relay device to transmit the screen image exceeds a pre-set bandwidth as the second terminal connected to the relay device is added.

The first terminal may determine whether the performance of the relay device and the status of the network to which the relay device is included correspond to the pre-set reference range based on the fed back information. Here, the pre-set reference range may be determined in relation to RTT, a data exchange delay time, a data loss rate, a frame rate, resolution, and a processing time of an encoder.

In operation S1150, the first terminal may select any one of the plurality of second terminals as a new relay device based on the performance information of the plurality of second terminals and the status information of the network to which each of the plurality of second terminals is included.

The first terminal according to an embodiment may select one of the other second terminals as the new relay device when the performance and the network status of the selected relay device do not correspond to the pre-set reference range. The first terminal may select a second terminal having performance and a status of a network corresponding to the pre-set reference range from among the other second terminals, as the new relay device.

In operation S1160, the first terminal may transmit a message notifying the selecting of the new relay device to each of the plurality of second terminals.

When the new relay device is selected, the first terminal according to an embodiment may transmit the message including ID information of the new relay device to each of the plurality of second terminals. Here, the ID information of the new relay device may include at least one of IP address information and a port number of the new relay device.

In operation S1170, the first terminal may transmit the screen image of the first terminal to the selected relay device. The screen image of the first terminal transmitted to the relay device may be transmitted to each of other second terminals that are not selected from among the plurality of second terminals through the relay device.

Figure 12:
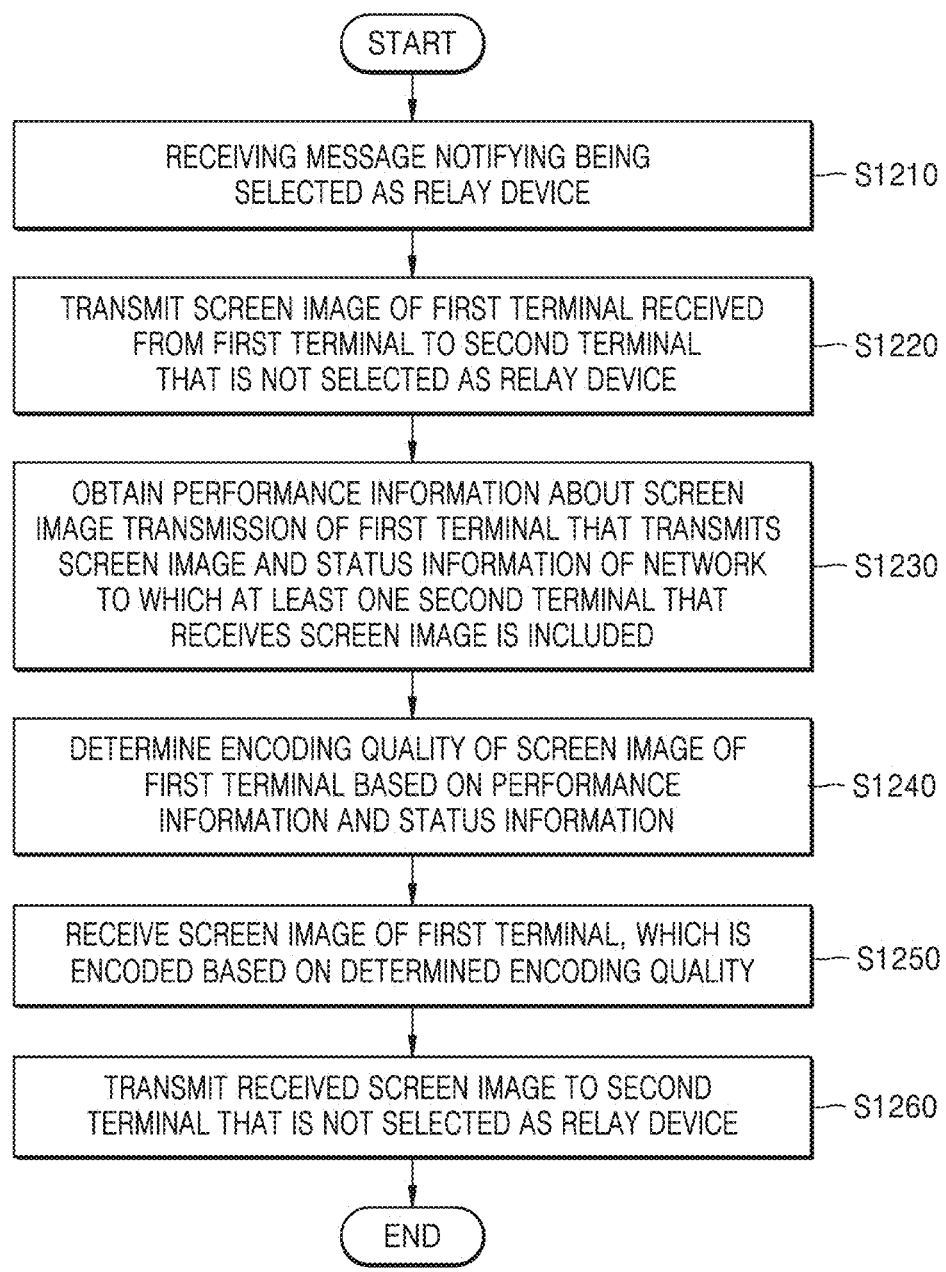
FIG. 12 is a flowchart for describing a method of transmitting, by a second terminal selected as a relay device from among a plurality of second terminals receiving a screen image of a first terminal, the screen image of the first terminal to other second terminals, according to an embodiment.

FIG. 12 is a flowchart for describing a method of transmitting, by a second terminal selected as a relay device from among a plurality of second terminals receiving a screen image of a first terminal, the screen image of the first terminal to other second terminals, according to an embodiment.

In operation S1210, one of the plurality of second terminals receiving the screen image of the first terminal may receive, from the first terminal, a message notifying that it is selected as the relay device. Here, the message may include ID information of the relay device. Also, according to another example, the message may include ID information of other second terminals that are not selected as the relay device, from among the plurality of second terminals, together with the ID information of the relay device. The second device selected as the relay device may set a communication session with each of the other second terminals by using the ID information of the other second terminals included in the message.

In operation S1220, the relay device may transmit the screen image of the first terminal received from the first terminal to the other second terminals that are not selected as the relay device.

According to an embodiment, the second terminal corresponding to the ID information included in the message may be selected as the relay device. The relay device may set a communication session with the other second terminals that are not selected as the relay device. The relay device may transmit the screen image received from the first terminal to each of the other second terminals through the set communication session. Here, the screen image of the first terminal may be encoded by the first terminal according to a pre-set frame rate and resolution.

In operation S1230, the relay device may obtain performance information about screen image transmission of the first terminal that transmits the screen image and status information of a network to which at least one second terminal that receives the screen image is included.

Meanwhile, operation S1230 may correspond to operation S210 described above with reference to FIG. 2.

In operation S1240, the relay device may determine encoding quality of the screen image of the first terminal based on the performance information and the status information.

Meanwhile, operation S1240 may correspond to operation S220 described above with reference to FIG. 2.

In operation S1250, the relay device may receive the screen image of the first terminal, which is encoded based on the determined encoding quality.

Meanwhile, operation S1250 may correspond to operation S230 described above with reference to FIG. 2.

In operation S1260, the relay device may transmit the received screen image to the second terminal that is not selected as the relay device.

Meanwhile, operation S1260 may correspond to operation S240 described above with reference to FIG. 2.

Figure 13:
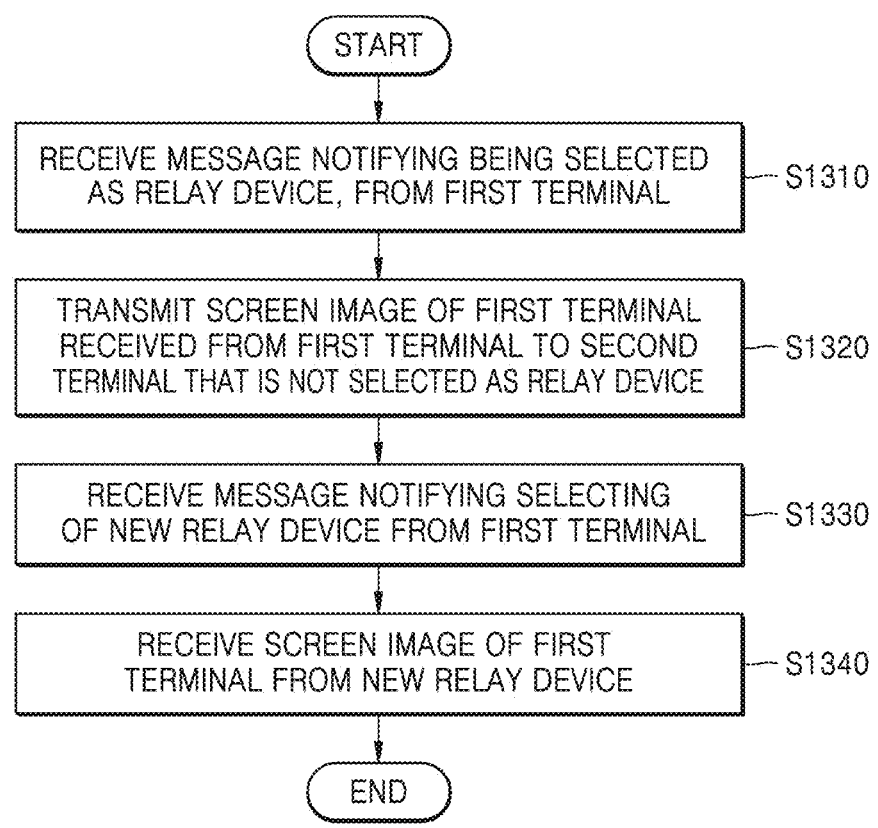
FIG. 13 is a flowchart for describing a method of sharing a screen image of a first terminal between a plurality of second terminals when a relay device is changed, according to an embodiment.

FIG. 13 is a flowchart for describing a method of sharing a screen image of a first terminal between a plurality of second terminals when a relay device is changed, according to an embodiment.

In operation S1310, one of the plurality of second terminals that receive the screen image of the first terminal may receive, from the first terminal, a message notifying that it is selected as the relay device.

Meanwhile, operation S1310 may correspond to operation S1210 described above with reference to FIG. 12.

In operation S1320, the relay device may transmit the screen image of the first terminal received from the first terminal to a second terminal that is not selected as the relay device from among the plurality of second terminals.

Meanwhile, operation S1320 may correspond to operation S1220 described above with reference to FIG. 12.

In operation S1330, the relay device may receive a message notifying selecting of a new relay device from the first terminal.

The first terminal may select a second terminal different from the second terminal selected as the relay device from among the plurality of second terminals as the new relay device, when performance of the relay device and a status of a network to which the relay device is included do not correspond to a pre-set reference range. When the new relay device is selected, the relay device may receive the message notifying selecting of the new relay device from the first terminal. Here, the message notifying selecting of the new relay device may be transmitted to each of the plurality of second terminals that receive the screen image form the first terminal. Also, the message notifying the selecting of the new relay device may include ID information of the new relay device.

In operation S1340, the relay device may receive the screen image of the first terminal from the new relay device.

The relay device according to an embodiment may end operations as the relay device when the new relay device is selected. The relay device may receive, as the second terminal that receives the screen image of the first terminal, the screen image of the first terminal through the new relay device.

Figure 14:
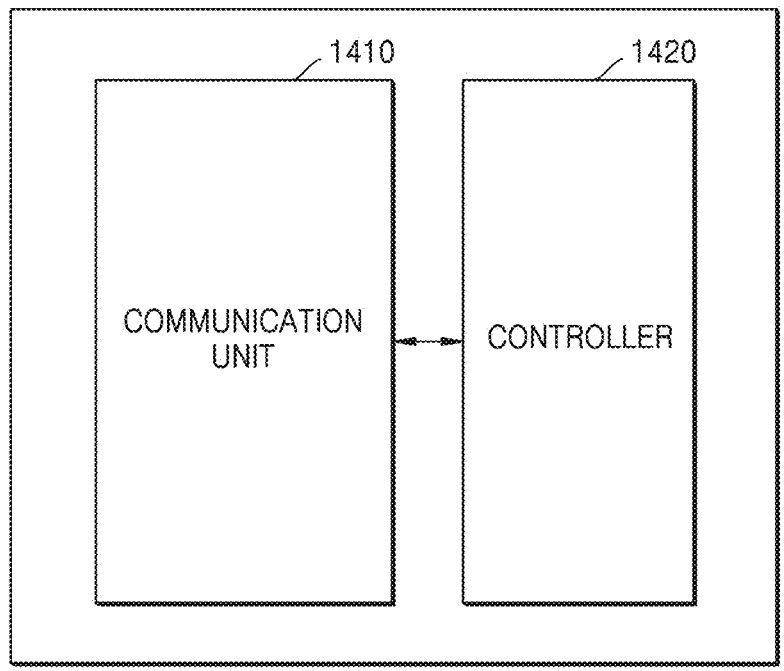
FIG. 14 is a block diagram of a relay device according to an embodiment.

FIG. 14 is a block diagram of a relay device 1400 according to an embodiment.

FIG. 14 only illustrates components of the relay device 1400 related to the current embodiment. As shown in FIG. 14, the relay device 1400 according to an embodiment may include a communication unit 1410 and a controller 1420. However, not all components shown in FIG. 14 are essential. The relay device 1400 may include more or less components than those shown in FIG. 14. For example, the relay device 1400 may further include a memory (not shown).

The communication unit 1410 may include a module for performing communication between the relay device 1400 and a first terminal or between the relay device 1400 and at least one second terminal. For example, the communication unit 1410 may include a short-range wireless communication unit (not shown) and a mobile communication unit (not shown).

The short-range wireless communication unit may include a Bluetooth communication unit, a Bluetooth low energy (BLE) communication unit, a near field communication (NFC) unit, a wireless local area network (WLAN) (Wi-Fi) communication unit, a ZigBee communication unit, an infrared data association (IrDA) communication unit, a Wi-Fi direct (WFD) communication unit, an ultra wideband (UWB) communication unit, and an Ant+ communication unit, but is not limited thereto.

The mobile communication unit transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The communication unit 1410 obtains performance information about screen image transmission of the first terminal that transmits a screen image, and status information of a network to which the at least one second terminal that receives the screen image is included.

Also, the communication unit 1410 receives the screen image of the first terminal, which is encoded according to encoding quality determined based on the performance information and the status information, from the first terminal. The communication unit 1410 transmits the received screen image to the at least one second terminal.

The communication unit 1410 according to an embodiment may transmit information about the determined encoding quality to the first terminal. The communication unit 1410 may obtain ID information of the at least one second terminal from the first terminal. Accordingly, a communication session may be set between the relay device and the at least one second terminal. Alternatively, as another example, the communication unit 1410 may receive ID information of the first terminal and ID information of the at least one second terminal from a server.

The controller 1420 may determine the encoding quality of the screen image of the first terminal based on the performance information and the status information. The controller 1420 according to an embodiment may determine a bit rate for transmitting the screen image to the at least one second terminal, based on the status information. Also, the controller 1420 may determine the encoding quality including at least one of resolution and a frame rate, based on the determined bit rate.

The controller 1420 according to an embodiment may set a communication session with the at least one second terminal based on the ID information of the at least one second terminal obtained by the communication unit 1410.

According to another embodiment, the relay device 1400 may be selected by the first terminal based on performance information of each of the plurality of second terminals that receive the screen image of the first terminal, and the status information of the network to which each of the plurality of second terminals is included. In this case, the communication unit 1410 may receive a message notifying being selected as a relay device.

Also, the communication unit 1410 may receive, from the first terminal, a message notifying that a second terminal having performance and a status of a network corresponding to a pre-set reference range is selected as a new relay device from among the plurality of second terminals, when performance of the relay device and the status of the network to which the relay device is included are outside the pre-set reference range. Accordingly, the communication unit 1410 may receive, from the selected second terminal, the screen image of the first terminal encoded according to encoding quality determined by the selected second terminal.

The memory (not shown) may store programs for processes and control of the controller 1420, and store input/output data (for example, the ID information of the at least one second terminal and the ID information of the first terminal).

The memory (not shown) may include at least one type of storage medium from among a flash memory, a hard disk, a multimedia card micro type memory, a card type memory (for example, a secure digital (SD) card or an extreme digital (XD) card), random access memory (RAM), static random access memory (SRAM), read-only memory (ROM), electrically erasable programmable read-only memory (EEPROM), programmable read-only memory (PROM), a magnetic memory, a magnetic disk, and an optical disk. Also, the relay device 1400 may operate a web storage or a cloud server that performs storage functions of the memory (not shown) on the Internet.

Figure 15:
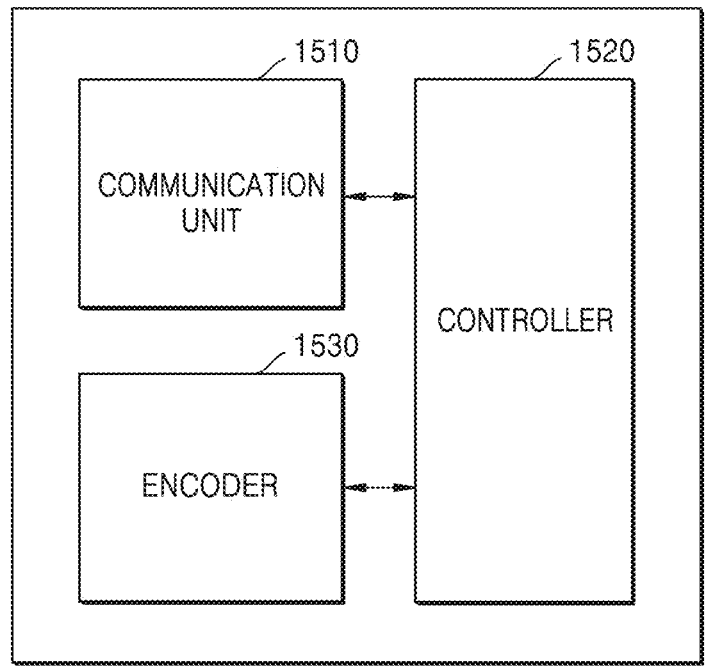
FIGS. 15 and 16 are block diagrams of a first terminal according to an embodiment.
Figure 16:
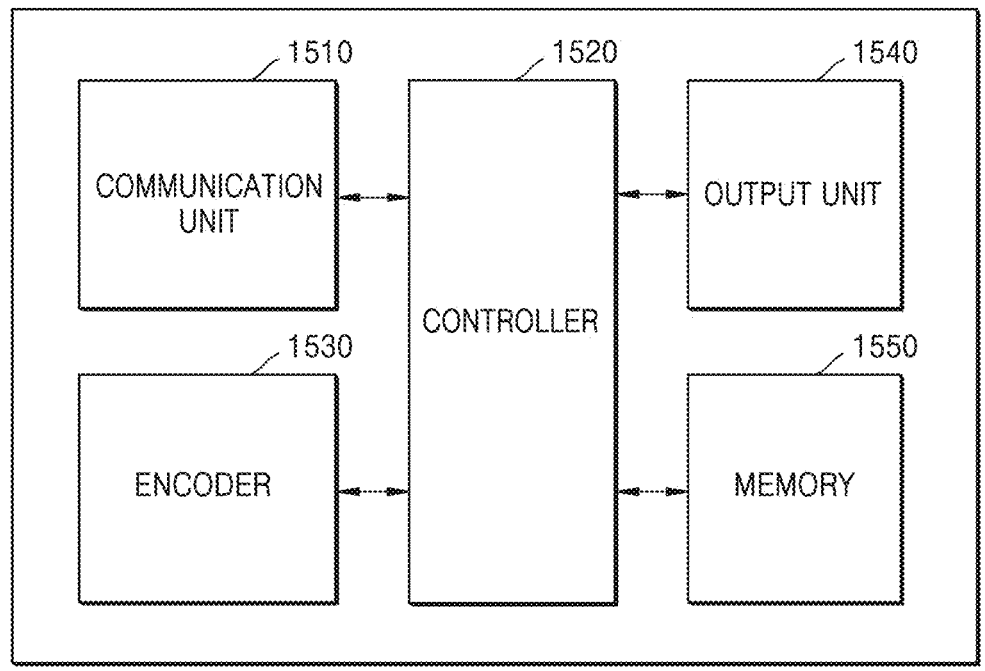

FIGS. 15 and 16 are block diagrams of a first terminal 1500 according to an embodiment.

FIG. 15 only illustrates components of the first terminal 1500 related to the current embodiment. As shown in FIG. 15, the first terminal 1500 according to an embodiment may include a communication unit 1510, a controller 1520, and an encoder 1530. However, not all components shown in FIG. 15 are essential. The first terminal 1500 may include more or less components than those shown in FIG. 15. For example, the first terminal 1500 may further include an output unit 1540 and a memory 1550 in addition to the communication unit 1510, the controller 1520, and the encoder 1530.

The communication unit 1510 may include a module for performing communication between the first terminal 1500 and a relay device or between the first terminal 1500 and at least one second terminal. For example, the communication unit 1510 may include a short-range wireless communication unit (not shown) and a mobile communication unit (not shown).

The short-range wireless communication unit may include a Bluetooth communication unit, a BLE communication unit, an NFC unit, a WLAN (Wi-Fi) communication unit, a ZigBee communication unit, an IrDA communication unit, a WFD communication unit, an UWB communication unit, and an Ant+ communication unit, but is not limited thereto.

The mobile communication unit transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The communication unit 1510 obtains, from a relay device that transmits a screen image of a first terminal to at least one second terminal, information about encoding quality of the screen image of the first terminal, which is determined based on performance information about screen image transmission of the first terminal and status information of a network to which the at least one second terminal is included. The communication unit 1510 transmits an encoded screen image to the relay device. Here, the encoded screen image is transmitted to the second terminal through the relay device.

Also, when the relay device is selected by the controller 1520, the communication unit 1510 according to an embodiment may transmit a message notifying the selecting of the relay device to each of the plurality of second terminals.

The controller 1520 may determine encoding quality of the screen image of the first terminal based on the obtained information about the encoding quality of the screen image of the first terminal. According to an embodiment, the controller 1520 may select at least one of the plurality of second terminals as a relay device based on performance information of each of the plurality of second terminals that receive the screen image of the first terminal and the status information of the network to which each of the plurality of second terminals is included.

When performance of the relay device and a status of a network to which the relay device is included are outside a pre-set reference range, the controller 1520 according to an embodiment may reselect another second terminal having performance and a status of a network corresponding to the pre-set reference range as the relay device from among the plurality of second terminals.

The encoder 1530 encodes the screen image of the first terminal based on the obtained information about the encoding quality. The encoder 1530 according to an embodiment may encode the screen image of the first terminal according to a frame rate and resolution, which are determined by the controller 1520 according to the information about the encoding quality. Also, the encoder 1530 may generate an FEC packet of the encoded screen image of the first terminal.

The output unit 1540 may output content executed by the first terminal 1500. An image displayed in the output unit 1540 may be captured by the controller 1520, thereby generating the screen image of the first terminal 1500.

However, this is only an embodiment, and the output unit 1540 may be included in an external device of the first terminal 1500. In this case, the external device may capture the image displayed in the output unit 1540 according to a capture command of the controller 1520, and provide the captured image to the first terminal 1500.

The memory 1550 may store programs for processes and control of the controller 1520, and store input/output data (for example, the ID information of the relay device, the ID information of the first terminal, and the information about the encoding quality of the screen image of the first terminal).

The memory 1550 may include at least one type of storage medium from among a flash memory, a hard disk, a multimedia card micro type memory, a card type memory (for example, a SD card or an XD card), RAM, SRAM, ROM, EEPROM, PROM, a magnetic memory, a magnetic disk, and an optical disk. Also, the first terminal 1500 may operate a web storage or a cloud server that performs storage functions of the memory 1550 on the Internet.

Figure 17:
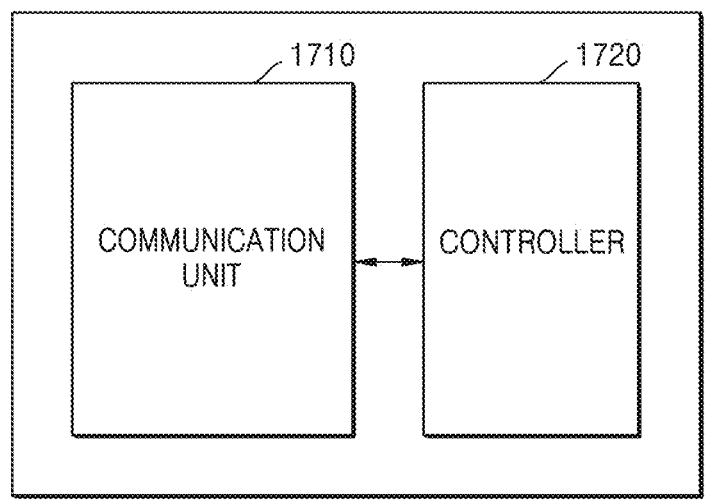
FIGS. 17 and 18 are block diagrams of a second terminal according to an embodiment.
Figure 18:
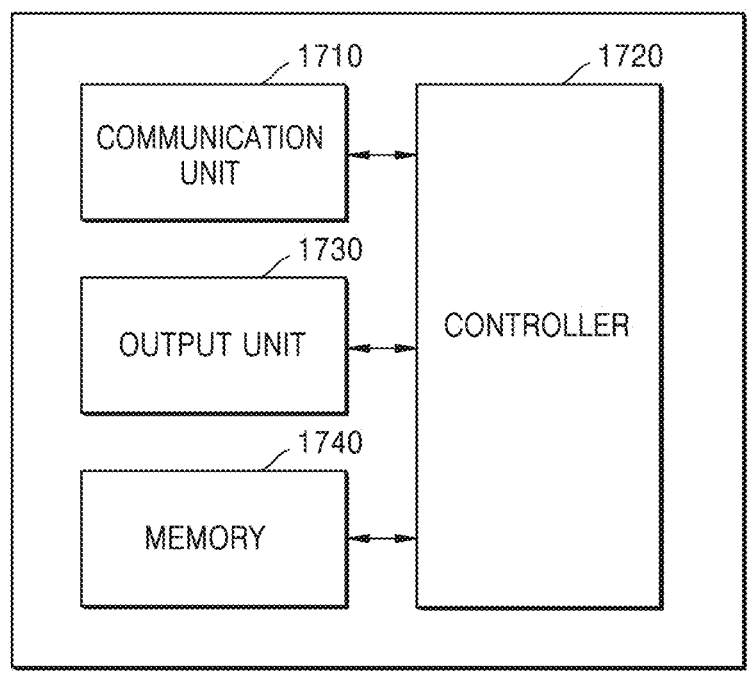

FIGS. 17 and 18 are block diagrams of a second terminal 1700 according to an embodiment.

FIG. 17 only illustrates components of the second terminal 1700 related to the current embodiment. As shown in FIG. 17, the second terminal 1700 according to an embodiment may include a communication unit 1710 and a controller 1720. However, not all components shown in FIG. 17 are essential. The second terminal 1700 may include more or less components than those shown in FIG. 17. For example, the second terminal 1700 may further include an output unit 1730 and a memory 1740 in addition to the communication unit 1710 and the controller 1720.

The communication unit 1710 may include a module for performing communication between the second terminal 1700 and a relay device or between the second terminal 1700 and a first terminal. For example, the communication unit 1710 may include a short-range wireless communication unit (not shown) and a mobile communication unit (not shown).

The short-range wireless communication unit may include a Bluetooth communication unit, a BLE communication unit, an NFC unit, a WLAN (Wi-Fi) communication unit, a ZigBee communication unit, an IrDA communication unit, a WFD communication unit, an UWB communication unit, and an Ant+ communication unit, but is not limited thereto.

The mobile communication unit transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The communication unit 1710 transmits information about a status of a network to which the second terminal 1700 is included to the relay device. Also, the communication unit 1710 receives a screen image of the first terminal, which is encoded according to encoding quality determined by the relay device, from the relay device.

Also, when the first terminal selects the relay device, the communication unit 1710 according to an embodiment may receive a message notifying selecting of the relay device.

Meanwhile, when the second terminal 1700 is selected as the relay device, the communication unit 1710 may transmit the screen image received from the first terminal to each of other second terminals.

The controller 1720 may obtain the information about the status of the network to which the second terminal 1700 is included. For example, when the screen image is received from the relay device, the controller 1720 may obtain information about RTT, a data loss rate, and a data delay rate.

When the message notifying the selecting of the relay device is received from the first terminal, the controller 1720 according to an embodiment may determine whether ID information of the relay device included in the received message matches ID information of the second terminal 1700. When the ID information of the relay device and the ID information of the second terminal 1700 match each other, the controller 1720 may operate as the relay device. For example, the controller 1720 may control the communication unit 1710 to set a communication session with the other second terminals by using ID information of the other second terminals included in the message notifying the selecting of the relay device.

The output unit 1730 may display the screen image of the first terminal received from the relay device. However, this is only an embodiment, and the output unit 1540 may be included in an external device of the second terminal 1700.

The memory 1740 may store programs for processes and controls of the controller 1720, and store input/output data (for example, the ID information of the relay device and the status information of the network to which the second terminal 1700 is included).

The memory 1740 may include at least one type of storage medium from among a flash memory, a hard disk, a multimedia card micro type memory, a card type memory (for example, a SD card or an XD card), RAM, SRAM, ROM, EEPROM, PROM, a magnetic memory, a magnetic disk, and an optical disk. Also, the second terminal 1700 may operate a web storage or a cloud server that performs storage functions of the memory 1740 on the Internet.

The methods described above may be recorded on a computer-readable recording medium by being realized by computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include ROM, RAM, CD-ROMs, magnetic tapes, floppy disks, optical data storage devices, etc. Examples of the computer commands include mechanical code prepared by a compiler, and high-level languages executable by a computer by using an interpreter.

The invention claimed is:

1. A method of controlling, by a relay device, screen sharing between a plurality of terminals, the method comprising:

obtaining capability information of a first terminal for transmitting a screen image, and status information of a network for indicating a degree of congestion of the network between the relay device and at least one second terminal, wherein the capability information comprises at least one of information on CPU usage, an encoding processing time and a frame rate;

determining an encoding quality of the first terminal about the screen image based on the capability information and the status information for indicating the degree of congestion of the network;

transmitting information about the determined encoding quality to the first terminal;

receiving a first screen image, encoded at the first terminal based on the encoding quality; and transmitting the first screen image to the at least one second terminal, wherein the determined encoding quality corresponds to one of a plurality of encoding quality levels supported by the first terminal.

2. The method of claim 1, wherein the determining of the encoding quality comprises:

determining a bit rate for transmitting the first screen image to the at least one second terminal, based on the status information; and determining the encoding quality comprising at least one of resolution and a frame rate, based on the determined bit rate.

3. The method of claim 1, wherein the relay device is selected as the first terminal based on capability information of each of a plurality of second terminals that receives the screen image of the first terminal and the status information of the network to which each of the plurality of second terminals is included.

4. The method of claim 1, wherein the status information of the network for indicating a degree of congestion of the network includes information about at least one of a round trip time (RTT), a data exchange delay time, and a data loss rate.

5. A relay device for controlling screen sharing between a plurality of terminals, the relay device comprising:
   a communication interface configured to obtain capability information of a first terminal for transmitting a screen image and status information of a network for indicating a degree of congestion of the network between the relay device and at least one second terminal, wherein the capability information comprises at least one of information on CPU usage, an encoding processing time and a frame rate; and
   a processor configured to determine an encoding quality of first terminal about the screen image of the first terminal based on the capability information and the status information for indicating the degree of congestion of the network,
   wherein the communication interface transmits information about the determined encoding quality to the first terminal, receives a first screen image, encoded at the first terminal based on the encoding quality, and transmits the first screen image to the at least one second terminal, and
   wherein the determined encoding quality corresponds to one of a plurality of encoding quality levels supported by the first terminal.

6. The relay device of claim 5, wherein the processor is further configured to determine a bit rate for transmitting the first screen image to the at least one second terminal based on the status information, and determine the encoding quality comprising at least one of resolution and a frame rate based on the determined bit rate.

7. The relay device of claim 5, wherein the relay device is selected at the first terminal based on capability information of each of a plurality of second terminals that receives the screen image of the first terminal and the status information of the network to which each of the plurality of second terminals is included.

8. The relay device of claim 5, wherein the status information of the network for indicating a degree of congestion of the network includes information about at least one of a round trip time (RTT), a data exchange delay time, and a data loss rate.

9. A first terminal for controlling screen sharing between a plurality of terminals, the first terminal comprising:
   a communication interface configured to obtain, from a relay device that transmits a screen image of the first terminal to at least one second terminal, information about an encoding quality of the screen image of the first terminal, which is determined based on capability information of the first terminal for transmitting the screen image and status information of a network for indicating a degree of congestion of the network between the relay device and the at least one second terminal, wherein the capability information comprises at least one of information on CPU usage, an encoding processing time and a frame rate;
   a processor configured to determine the encoding quality of the screen image of the first terminal based on the obtained information about the encoding quality; and
   an encoder configured to encode the screen image of the first terminal based on the determined encoding quality,
   wherein the communication interface is further configured to transmit the encoded screen image to the relay device,
   the encoded screen image is transmitted to the at least one second terminal through the relay device, and
   the determined encoding quality corresponds to one of a plurality of encoding quality levels supported by the first terminal.

10. The first terminal of claim 9, wherein the processor is further configured to select at least one of a plurality of second terminals as the relay device based on capability information of each of the plurality of second terminals that receives the screen image of the first terminal and the status information of the network to which each of the plurality of second terminals is included, and
   the communication interface is further configured to transmit a message notifying the selection of the relay device to each of the plurality of second terminals.

11. The first terminal of claim 9, wherein the status information of the network for indicating a degree of congestion of the network includes information about at least one of a round trip time (RTT), a data exchange delay time, and a data loss rate.

12. A second terminal for controlling screen sharing between a plurality of terminals, the second terminal comprising:
   a processor configured to obtain, by the second terminal that receives a screen image of a first terminal, status information of a network for indicating a degree of congestion of the network to which the second terminal is included; and
   a communication interface configured to transmit the obtained status information, and receive an encoded screen image, encoded at the first terminal, from a relay device, according to an encoding quality determined at the relay device,
   wherein the encoding quality is determined based on capability information of a first terminal for transmitting the screen image and the status information of a network for indicating the degree of congestion of the network between the relay device and at least one second terminal, wherein the capability information comprises at least one of information on CPU usage, an encoding processing time and a frame rate.

13. The second terminal of claim 12, wherein the status information of the network for indicating a degree of congestion of the network includes information about at least one of a round trip time (RTT), a data exchange delay time, and a data loss rate.

14. A non-transitory computer-readable recording medium having recorded thereon a program which, when executed by a computer, performs the method of claim 1.

* * * * *